US010529005B2

(12) United States Patent
Smirin

(10) Patent No.: US 10,529,005 B2
(45) Date of Patent: Jan. 7, 2020

(54) SYSTEM AND METHOD FOR ORDERING A TRANSPORTATION VEHICLE

(71) Applicant: GT Gettaxi Limited, Limassol H.E. (CY)

(72) Inventor: Shahar Smirin, Jerusalem (IL)

(73) Assignee: GT Gettaxi Limited, Limassol H.E. (CY)

( * ) Notice: Subject to any disclaimer, the term of this patent is extended or adjusted under 35 U.S.C. 154(b) by 818 days.

(21) Appl. No.: 14/471,774

(22) Filed: Aug. 28, 2014

(65) Prior Publication Data

US 2015/0066606 A1 Mar. 5, 2015

Related U.S. Application Data

(60) Provisional application No. 61/872,516, filed on Aug. 30, 2013.

(51) Int. Cl.
*G06Q 50/30* (2012.01)
*G06Q 30/06* (2012.01)
*G07B 15/00* (2011.01)
*G06Q 20/18* (2012.01)
*G06Q 10/02* (2012.01)
*G06Q 10/06* (2012.01)

(52) U.S. Cl.
CPC ......... *G06Q 30/0633* (2013.01); *G06Q 10/02* (2013.01); *G06Q 10/0631* (2013.01); *G06Q 20/18* (2013.01); *G07B 15/00* (2013.01)

(58) Field of Classification Search
USPC ............... 705/13, 7.11, 7.12, 5, 6, 14.37
See application file for complete search history.

(56) References Cited

U.S. PATENT DOCUMENTS

| | | | | |
|---|---|---|---|---|
| 6,169,975 B1* | 1/2001 | White | ................... | G06K 7/084 235/381 |
| 8,630,897 B1* | 1/2014 | Prada Gomez | .... | G06Q 30/0241 705/14.11 |
| 2002/0010604 A1* | 1/2002 | Block | ................... | G06Q 10/02 705/6 |
| 2002/0099599 A1* | 7/2002 | Minassian | ............. | G06Q 10/08 705/13 |
| 2003/0055689 A1* | 3/2003 | Block | ................... | G06Q 10/02 705/5 |
| 2003/0154160 A1* | 8/2003 | Arndt | ..................... | G06Q 40/00 705/37 |
| 2004/0076280 A1* | 4/2004 | Ando | ..................... | G08G 1/202 379/220.01 |

(Continued)

FOREIGN PATENT DOCUMENTS

EP 2273468 A1 1/2011

OTHER PUBLICATIONS

European Search Report and Search Opinion dated Dec. 17, 2014 for EP14182705.

*Primary Examiner* — Akiba K Allen
(74) *Attorney, Agent, or Firm* — Lowenstein Sandler LLP

(57) ABSTRACT

Systems and methods for ordering a transportation vehicle are disclosed. A method includes receiving an order request from a kiosk at a kiosk location. The order request is transmitted to a computing device of a transportation vehicle. A response from the computing device is received indicating acceptance of the order request. A vehicle location of the transportation vehicle is identified and transmitted to the kiosk.

20 Claims, 19 Drawing Sheets

(56) References Cited

U.S. PATENT DOCUMENTS

| | | | |
|---|---|---|---|
| 2004/0087273 A1* | 5/2004 | Perttila | G01S 13/751 455/41.2 |
| 2004/0186768 A1* | 9/2004 | Wakim | G06F 17/30876 705/14.27 |
| 2004/0254861 A1* | 12/2004 | Pentel | G06Q 20/1085 235/384 |
| 2006/0059023 A1* | 3/2006 | Mashinsky | G06Q 10/02 705/5 |
| 2006/0200381 A1 | 9/2006 | Elkholy et al. | |
| 2007/0136222 A1 | 6/2007 | Horvitz | |
| 2007/0140222 A1* | 6/2007 | Kowalczyk | G06Q 30/06 370/352 |
| 2007/0239565 A1* | 10/2007 | Pentel | G06Q 10/02 705/17 |
| 2007/0271123 A1* | 11/2007 | Miyashita | G06Q 10/02 705/5 |
| 2008/0010375 A1* | 1/2008 | Coleman | H04L 63/029 709/225 |
| 2008/0189207 A1* | 8/2008 | Wurster | G06Q 10/02 705/40 |
| 2008/0304641 A1* | 12/2008 | Rowe | H04M 11/04 379/111 |
| 2011/0009098 A1* | 1/2011 | Kong | G06Q 10/02 455/414.1 |
| 2011/0099040 A1* | 4/2011 | Felt | G06F 17/3087 705/7.12 |
| 2011/0153453 A1* | 6/2011 | Ghafoor | G06Q 10/02 705/26.9 |
| 2011/0173549 A1* | 7/2011 | Hipskind | G06Q 20/1085 715/756 |
| 2011/0238296 A1* | 9/2011 | Purks | G06Q 30/00 701/533 |
| 2012/0041675 A1* | 2/2012 | Juliver | G06Q 10/08 701/465 |
| 2012/0092190 A1* | 4/2012 | Stefik | G06Q 10/02 340/932.2 |
| 2012/0127308 A1* | 5/2012 | Eldershaw | G08G 1/147 348/143 |
| 2013/0054282 A1* | 2/2013 | Pinkus | G06Q 10/02 705/5 |
| 2013/0090959 A1* | 4/2013 | Kvamme | G06Q 10/02 705/5 |
| 2013/0238432 A1* | 9/2013 | Bai | G06F 17/30867 705/14.52 |
| 2014/0046737 A1* | 2/2014 | Graves | G06Q 20/0655 705/13 |

* cited by examiner

SYSTEM AND METHOD FOR ORDERING A TRANSPORTATION VEHICLE

CROSS-REFERENCE TO RELATED APPLICATION

This application claims the benefit of priority of U.S. Provisional Patent Application No. 61/872,516, filed Aug. 30, 2013, which is hereby incorporated by reference herein in its entirety.

TECHNICAL FIELD

This disclosure relates to transportation services and, in particular, to receiving and processing transportation order requests.

BACKGROUND

Transportation services, such as ridesharing and taxi services, often provide their services via smart phone application interfaces. The interfaces may allow users to request a pick-up by a driver of a transportation vehicle, cancellation of the request, and payment for the service. However, in many situations, requests and cancellations from multiple users at different, and sometimes inconvenient, locations lead to less than optimal dispatching of transportation vehicles to handle the requests.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
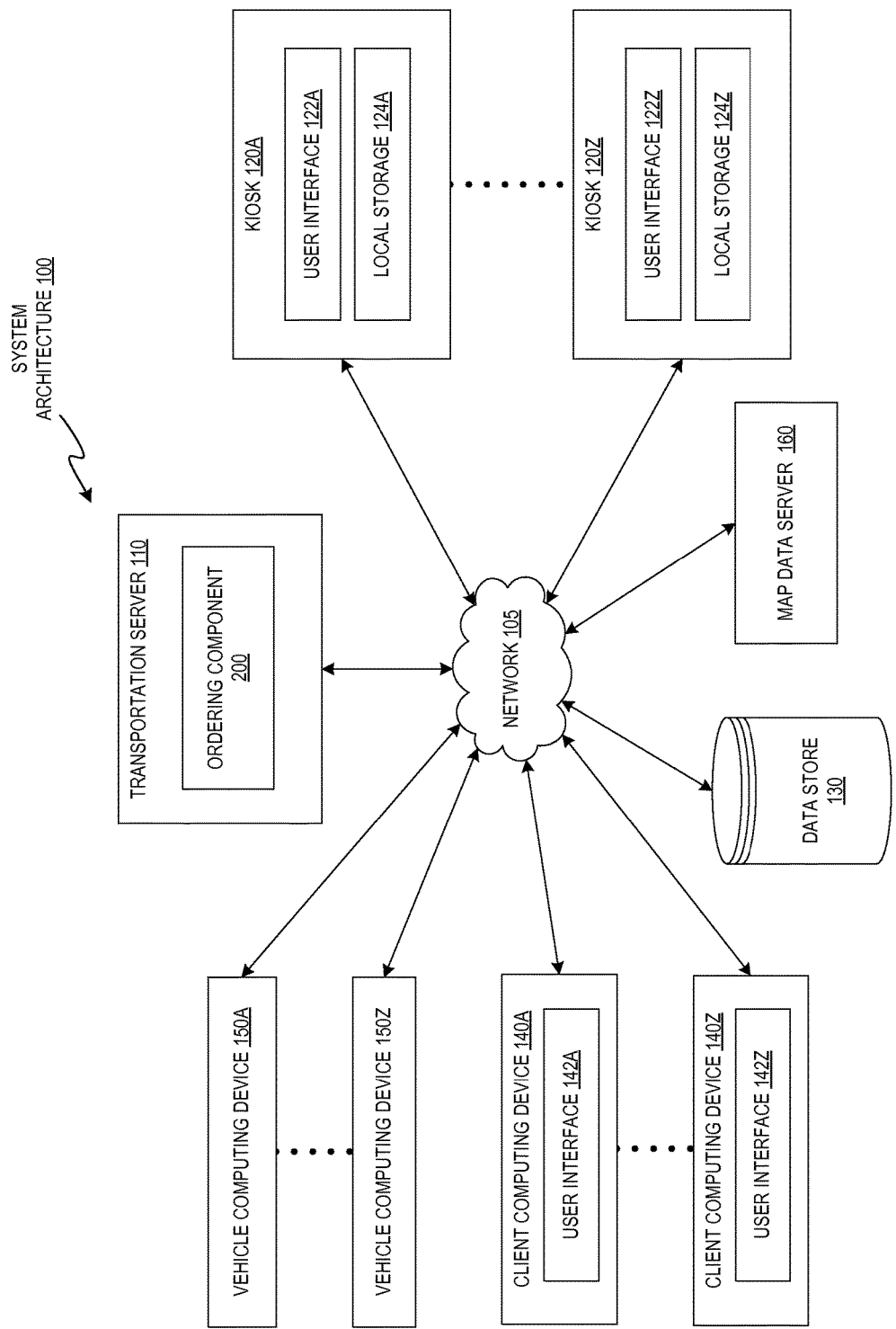
FIG. 1 illustrates an example system architecture in accordance with an implementation of the disclosure.

Described herein are systems and methods for ordering a transportation vehicle. In one implementation, an application executed on a computing device (e.g., a computer, a tablet computer, etc.) that is included as part of a kiosk, or some other physical structure such as a booth, a stall, a counter, a stand, etc., provides a graphical user interface (GUI) that allows a user to order a transportation entity (e.g., a taxi, a shuttle, a limousine, a bus, etc.). The kiosk may be located at a fixed geographical location (e.g., in a restaurant, a mall entrance, a movie theater, etc.). When the user accesses or activates the kiosk, the kiosk may prompt the user for contact information and/or identification information. The kiosk may provide the user with a list of one or more transportation vehicles in a geographical location around the kiosk and the user may select one of more of the transportation vehicles from the list. The kiosk may transmit a message to one or more services to order the selected transportation vehicle for the user.

The described implementations of the present disclosure allow users to order transportation vehicles more easily using a client computing device, such as a smart phone, or an electronic kiosk that can process multiple orders from clients in parallel at a specific location. To begin the ordering process, the user may be prompted for contact information (e.g., a phone number, an e-mail address, etc.) and a selection of a transportation vehicle. In some implementations, the selection is performed for the user automatically by a transportation server. Once a transportation vehicle is identified, the transportation vehicle is instructed to pick up the user at the physical location of the kiosk. The kiosk may provide a variety of information to the user such as estimated time of arrival (ETA) of the transportation vehicle, information about the driver of the transportation vehicle (such as driver name and/or phone number), information about the transportation vehicle (e.g., type of vehicle, make, model, year, etc.), updates about whether a driver will be late, or has arrived and is waiting, and whether a ride has been completed (e.g., whether the transportation vehicle has arrived at the destination specified by the user), etc. The kiosk may also support multiple languages (e.g., English, Russian, Hebrew, Chinese, etc.).

In some implementations, the user may also install a separate application (e.g., an app) on his/her client computing device (e.g., smartphone, cell phone etc.). The user may be able to request and view the same information about the transportation vehicle (e.g., ETA, driver name, driver phone number, make/model of vehicle, rates or costs to user the vehicle, etc.) using the mobile application.

It is noted that implementations involving a kiosk are illustrative, and that other methods of carrying out the described implementations may be used, such as placing orders with client computing devices and instructing the transportation vehicle to drive to a location of the client computing device (e.g., based on GPS data for the client computing device).

FIG. 1 illustrates an example system architecture 100, in accordance with an implementation of the disclosure. The system architecture 100 includes a transportation server 110, kiosks 120A-120Z, a data store 130, vehicle computing devices 150A-150Z, client computing devices 140A-140Z, and a map data server 160. The components 110-160 may be communicatively connected via a network 105, which is described in greater detail below.

In one implementation, the transportation server 110 and the map data server 160 may each correspond to one or more computing devices (e.g., a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The transportation server 110 may include an ordering component 200 (which may be executed by a processing device of the transportation server 110) that is capable of receiving orders from the kiosks 120A-120Z and the client computing devices 140A-140Z, transmitting order requests to the vehicle computing devices 150A-150Z, dispatching transportation vehicles (e.g., a taxis), and performing location tracking of the transportation vehicles.

In some implementations, the ordering component 200 may be implemented on a different device than transportation server 110. For example, in some implementations, one or more of the kiosks 120A-120Z may implement the ordering component 200 (or at least some of the functionality of the ordering component 200). In some implementations, one or more of the client computing devices 130A-130Z may implement the ordering component 200 (or at least some of the functionality of the ordering component 200). In some implementations, some or all of the functionality of the ordering component 200 may be distributed across one or more of the kiosks 120A-120Z, one or more of the client computing devices 140A-140Z, and/or one or more of the vehicle computing devices 150A-150Z. In some implementations, the transportation server 110 may be omitted from the system architecture 100. In some implementations, more than one transportation server 110 may be included in the system architecture 100.

In one implementation, the map data server 160 includes map data for a variety of locations (e.g., city maps), as well as real-time traffic conditions, detours (e.g., due to construction), etc. The map data server 160 may provide map data to one or more devices within the system architecture 100 via the network 105. In some implementations, the transportation server 110 may receive map data from the map data server 160, which may be used by the ordering component 200 to compute an estimated time of arrival (ETA) for a transportation vehicle to arrive at a particular location (e.g., a location of one of the kiosks 120A-120Z).

In one implementation, each of the kiosks 120A-120Z may be public computer terminals that are located at fixed geographical locations. For example, one kiosk may be located near a first entrance in a mall, another kiosk may be located in another entrance of the mall, another kiosk may be located in a movie theater or restaurant, etc. When placing an order for a transportation vehicle, a user of one of the kiosks 120A-120Z may place the order without specifying location information, and the kiosk may provide its own location information to the transportation server 110. In one implementation, the transportation server may include a database (e.g., stored in the data store 130) that indicates physical location of one or more of the kiosks 120A-120Z. For example, when the transportation server 110 receives an order request for a transportation vehicle from the kiosk 120A, the transportation server 110 may look up a location of the kiosk 120A based on an identifier received from the kiosk 120A (e.g., each of the kiosks 120A-120Z may have associated identifiers such as unique serial numbers), and the determined location of the kiosk 120A may be automatically transmitted to one or more vehicle computing devices 150A-150Z of transportation vehicles. In some implementations, one or more of the kiosks 120A-120Z may include global positioning system (GPS) tracking devices, which can determine locations of the kiosks 120A-120Z. In some implementations, one or more of the kiosks 120A-120Z may be portable, and location information may be transmitted to the transportation server 110 from the one or more kiosks 120A-120Z upon arriving at a new location.

The kiosks 120A-120Z may each implement user interfaces 122A-122Z, respectively. Each of user interfaces 122A-122Z may allow a user of the respective kiosk 120A-120Z to send/receive information to/from the transportation server 110, the data store 130, any of client computing devices 140A-140Z, any of the vehicle computing devices 150A-150Z, and the map data server 160. For example, one or more of the user interfaces 122A-122Z may be a web browser interface that can access, retrieve, present, and/or navigate content (e.g., web pages such as Hyper Text Markup Language (HTML) pages) provided by the transportation server 110.

In one implementation, one or more of the user interfaces 122A-122Z may be a standalone application (e.g., a mobile app), which may have been provided by the transportation server 110 (e.g., as a downloadable application to be installed by an administrator), that allows a user of a respective kiosk 120A-120Z to send and receive information to the transportation server 110. In some implementations, the user interfaces 122A-122Z implement custom software to prevent users from accessing/modifying system functions of the respective kiosks 120A-120Z. In one implementation, each of the kiosks 120A-120Z is fully configurable through the respective user interfaces 122A-122Z. For example, the settings of the kiosk (e.g., the physical location, an identifier for the kiosk 120A, and other configuration settings) may be set by an administrator via the user interface 122A. The user interfaces 122A-122Z and their functionality are described in greater detail with respect to FIGS. 4-8.

In one implementation, each of the kiosks 120A-120Z may include local storages 124A-124Z. Each of the local storages 124A-124Z may store order requests and associated information, such as contact info of client computing devices 140A-140Z of users that placed the order requests. The local storages 124A-124Z may also include lists of transportation vehicles located in the surrounding area, locations of the transportation vehicles, map data of the surrounding area, and estimated times of arrival for transportation vehicles en route to respective kiosks 120A-120Z. In some implementations, the kiosks 120A-120Z may transmit data stored in their respective local storages 124A-124Z to the transportation server 110, and may also update the data stored in their respective local storages 124A-124Z based on data received from the transportation server 110, the vehicle computing devices 150A-150Z, and/or the map data server 160.

In one implementation, the client computing devices 140A-140Z may include computing devices such as personal computers (PCs), laptops, mobile phones, smart phones, tablet computers, netbook computers, etc. The client computing devices 140A-140Z may also be referred to as "user devices". An individual user may be associated with (e.g., own and/or use) one or more of the client computing devices 140A-140Z, and the client computing devices 140A-140Z may each be owned and utilized by different users at different locations. As used herein, a "user" may refer generally to an individual operator of one or more of the client computing devices 140A-140Z and/or one or more of the kiosks 120A-120Z, as well as one or more of the vehicle computing devices 150A-150Z (e.g., a driver of a transportation vehicle).

The client computing devices 140A-140Z may each implement one of user interfaces 142A-142Z (e.g., which may have some or all of the functionality of user interfaces 122A-122Z). In some implementations, the user interfaces 142A-142Z may allow their respective client computing devices 140A-140Z to interact directly with one or more of the kiosks 120A-120Z. In some implementations, the user interfaces 142A-142Z may allow their respective client computing devices 140A-140Z to interact directly with the transportation server 110 without interacting with one or more of the kiosks 120A-120Z. For example, an order request for a transportation vehicle may be transmitted from the client computing device 140A to the transportation server 110, along with location information pertaining to the client computing device 140A.

In one implementation, the vehicle computing devices 150A-150Z may be computing devices (e.g., "driver boxes") that are located on-board transportation vehicles (e.g., as built-in computing devices or separate/portable devices operated by drivers of the transportation vehicles). The vehicle computing devices 150A-150Z may include computing devices such as personal computers (PCs), laptops, mobile phones, smart phones, tablet computers, netbook computers, etc. The vehicle computing devices 150A-150Z may have some or all of the functionality of each of the client computing devices 140A-140Z, and may be configured to exchange data with each other as well as with the transportation server 110, the kiosks 120A-120Z, the data store 130, the client computing devices 140A-140Z, and the map data server 160.

A driver operating one of vehicle computing devices 150A-150Z may receive order requests, accept order requests, decline order requests, and/or transfer order requests to other drivers (e.g., other drivers operating vehicle computing devices 150A-150Z). In one implementation, the vehicle computing devices 150A-150Z may include GPS tracking devices for tracking locations of their respective transportation vehicles. Location data generated by the GPS tracking devices may be transmitted to the transportation server 110 and utilized, for example, to compute estimate times of arrival.

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to one or more of the kiosks 120A-120Z, the transportation server 110, one or more of the client computing devices 140A-140Z, one or more of the vehicle computing devices 150A-150Z, and/or the map data server 160. One or more of the devices of the system architecture 100 may utilize the data store 130 to store public and private data. The data store 130 may be configured to provide secure storage for private data.

In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks. In one implementation, one or more of the client computing devices 140A-140Z may communicate directly with one or more of the kiosks 120A-120Z. For example, the client computing device 140A may include a Bluetooth device that sends/receives data to/from the kiosk 120A.

Figure 2:
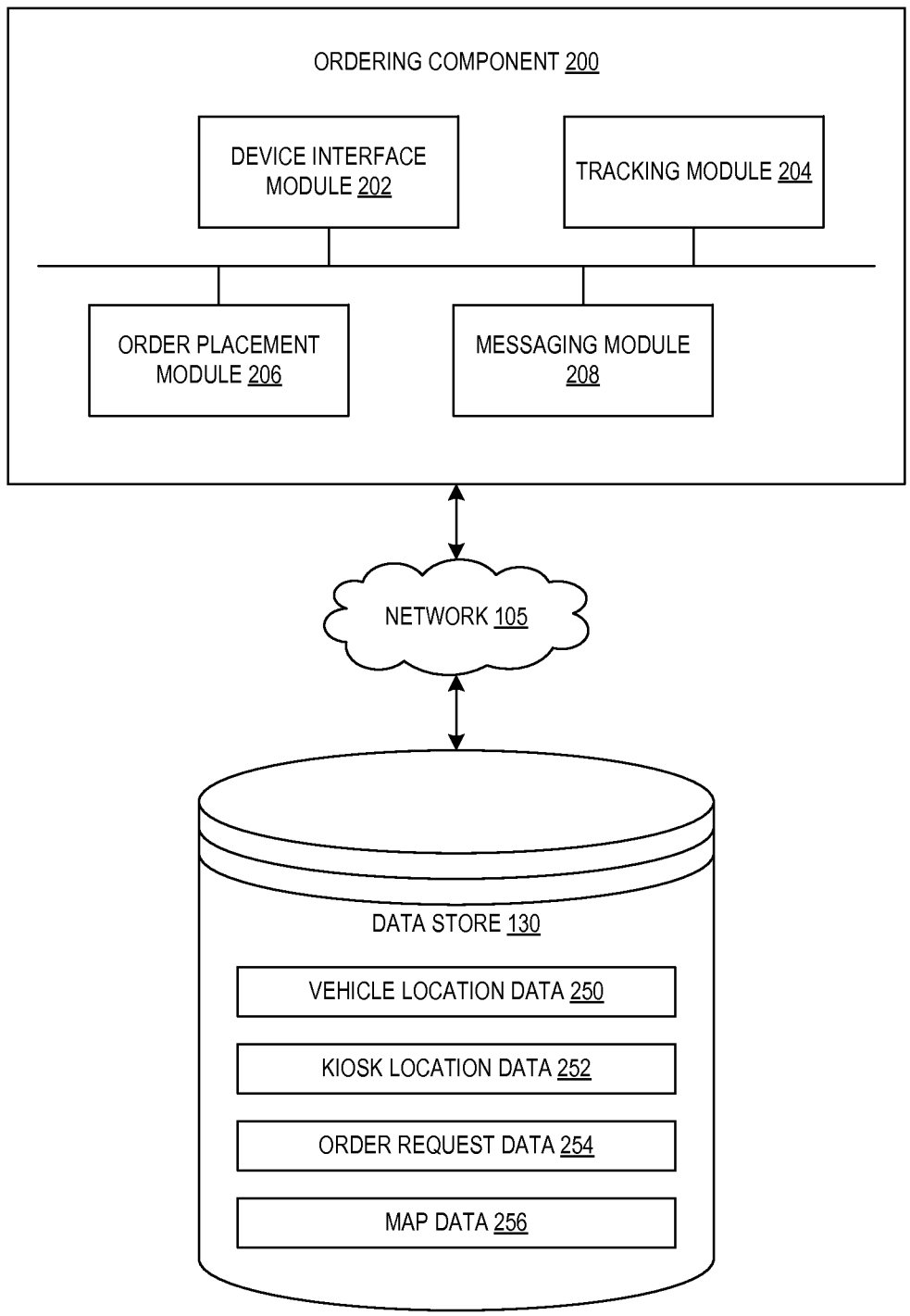
FIG. 2 is a block diagram illustrating features of an ordering component according to an implementation of the disclosure.

FIG. 2 is a block diagram illustrating features of an ordering component 200 in accordance with an implementation of the disclosure. The ordering component 200 may be the same as its identically named counterpart of FIG. 1. In one implementation, the ordering component 200 includes a device interface module 202, a tracking module 204, an order placement module 206, and a messaging module 208. More or less components may be included in the ordering component 200 without loss of generality. For example, two or more of the modules may be combined into a single module, or one of the modules may be divided into two or more modules.

In one implementation, one or more of the modules may reside on different computing devices (e.g., on different server computers, on a kiosk, distributed among multiple kiosks, etc.). For illustrative purposes, the ordering component 200 is described as being implemented by the transportation server 110, but it may be implemented at least partially by any of the kiosks 120A-120Z, any of the client computing devices 140A-140Z, and any of the vehicle computing devices 150A-150Z. For example, a kiosk (e.g., kiosk 120A) may be programmed to perform some or all of the functions of the ordering component 200. When the ordering component 200 is implemented on a device other than the transportation server 110, any functions described with respect to the ordering component 200 that "receive", "transmit", "generate", "retrieve", "identify", "determine", "select", etc., are understood to refer to functions performed by sub-systems or sub-modules within the implementing device rather than across a network (e.g., the network 105), as would be appreciated by one of ordinary skill in the art.

In one implementation, the device interface module 202 is utilized by the ordering component 200 to exchange data between one or more devices (e.g., one or more devices of the system architecture 100). In one implementation, the device interface module 202 may exchange message data between transportation vehicles (e.g., between vehicle computing devices 150A-150Z), and may store vehicle location data 250 in the data store 130. In one implementation, the device interface module 202 may maintain kiosk location data 252, and update the kiosk location data 252 to include newly-added kiosks and updated locations for current kiosks. In one implementation, the device interface module 202 may process order request data 254 received from kiosks (e.g., the kiosks 120A-120Z), which may be stored in the data store 130. In one implementation, the device interface module 202 may receive and store map data 256 (which may be received from the map data server 160).

In one implementation, the tracking module 204 is utilized by the ordering component 200 to track the locations of transportation vehicles (e.g., based on location data received from the vehicle computing devices 150A-150Z). In one implementation, in response to the device interface module 202 receiving an order request from a kiosk, the tracking module 204 may identify the closest vehicles to the kiosk within a pre-defined range of the kiosk (e.g., a 1 mile radius, a 5 mile radius, etc.). The pre-defined range may be configured by an administrator of a system of the ordering component 200.

In one implementation, the tracking module 204 may receive updated location data periodically from each of the plurality of vehicle computing devices 150A-150Z, which may be used to determine current location, driving direction, and estimated time of arrival at a particular kiosk. In one implementation, an estimated time of arrival for a transportation vehicle may be computed based on any of the current location of the transportation vehicle, a current speed of the transportation vehicle, an average speed of the transportation vehicle, an optimized route for traveling from the current location to a destination (e.g., a kiosk location), speed limits along the optimized route, or current traffic conditions.

In one implementation, the order placement module 206 may be utilized by the ordering component 200 to transmit order requests to one or more of the vehicle computing devices 150A-150Z of transportation vehicles. In one implementation, the order placement module 206 may transmit an order request to one or more of the vehicle computing devices 150A-150Z within a pre-defined range of a kiosk or client computing device from which the order request was received. In one implementation, the order placement module 206 may transmit the order request to one or more of the vehicle computing devices corresponding to one or more user-selected transportation vehicles (e.g., using one of the user interfaces 122A-122Z). For example, the user may prefer a particular make/model of transportation vehicle or a particular driver, and may make indicate the preference when placing the order request.

In one implementation, a user of a kiosk used to place an order request may be assigned a transportation vehicle in response to receiving a response from a vehicle computing device of the transportation vehicle indicating acceptance of the order request. After assigning the transportation vehicle, location information associated with the transportation vehicle may be transmitted periodically (e.g., from the transportation server 110) to the kiosk and/or client computing device of the user.

In one implementation, the messaging module 208 may be utilized by the ordering component 200 to transmit order-related updates to one or more of the client computing devices 140A-140Z. The messages may include any type of electronic communication messages, such as short message service (SMS) messages, e-mails, text messages, etc. to a client computing device of the user that placed an order request.

Figure 3:
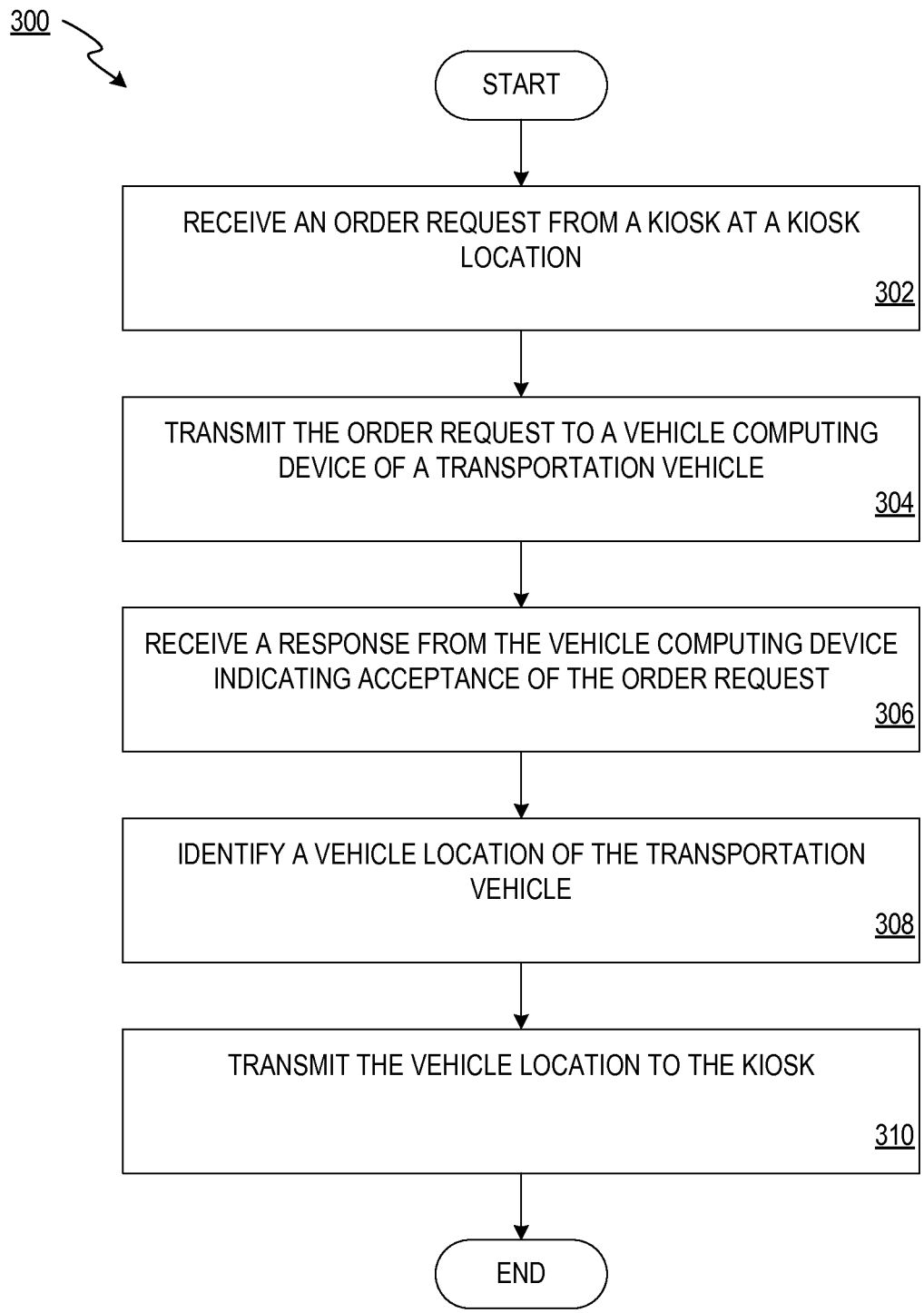
FIG. 3 is a flow diagram illustrating a method for ordering a transportation vehicle according to an implementation of the disclosure.

FIG. 3 is a flow diagram illustrating a method 300 for ordering a transportation vehicle according to an implementation of the disclosure. The method 300 may be performed by processing logic that includes hardware (e.g., circuitry, dedicated logic, programmable logic, microcode, etc.), software (e.g., instructions run on a processing device to perform hardware simulation), or a combination thereof. In one implementation, the method 300 may be performed by the ordering component 200, which may be implemented by the transportation server 110, one or more of the kiosks 120A-120Z, one or more of the client computing devices 130A-130Z, one or more of the vehicle computing devices 150A-150Z, or combinations thereof.

Referring to FIG. 3, the method 300 begins at block 302 where an order request (e.g., at the transportation server 110) is received from a kiosk at a kiosk location (e.g., one of the kiosks 120A-120Z). In one implementation, a user may use a kiosk to place an order request for a transportation vehicle. In another implementation, the user may place the order request using his/her own client computing device (e.g., one of the client computing devices 124A-140Z), which is transmitted to the transportation server. In some implementations, the user may input the order request into his/her own client computing device, which is then transmitted to a nearby kiosk (e.g., a kiosk within a pre-defined range of the client computing device) without the user directly inputting the order request using a user interface of the kiosk. For example, if the user's client computing device is within a pre-defined range of the kiosk (e.g., 20 feet), the order request may be transmitted to the kiosk for processing (e.g., via a Bluetooth interface). The order may then appear on a display screen of the kiosk among other pre-existing orders.

In one implementation, the user may activate the kiosk to begin ordering a transportation vehicle. For example, the user may tap a touchscreen on the kiosk to begin ordering the transportation vehicle. The kiosk may prompt the user to provide contact information such as a phone number, an email address, etc. In one implementation, the user may select a transportation vehicle from a list of transportation vehicles. In another implementation, the user may not be able to select a particular vehicle and a transportation vehicle may be selected automatically (e.g., by the transportation server 110).

Figure 4A:
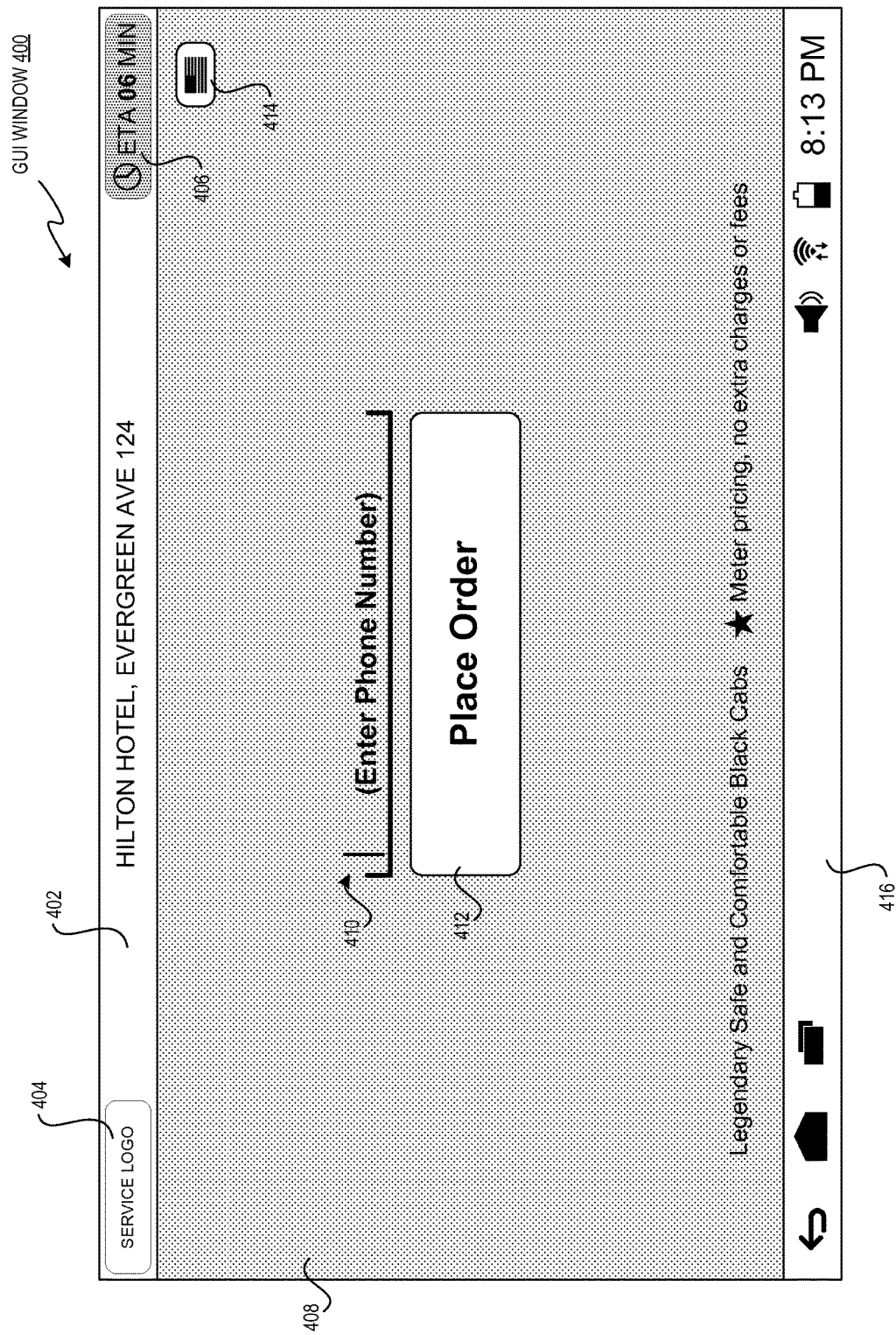
FIG. 4A illustrates an exemplary graphical user interface window for ordering a transportation vehicle according to an implementation of the disclosure.

FIG. 4A illustrates an exemplary GUI window 400 for ordering a transportation vehicle according to an implementation of the disclosure. The GUI window 400 includes a header region 402, which may include the address or location of the kiosk (e.g., Hilton Hotel, Evergreen Ave 124), a service logo 404 for a provider of the transportation service, and an ETA indicator 406 that indicates an estimated time of arrival based on current traffic conditions and transportation vehicle whereabouts. A main window 408 includes a text field 410 for a user to enter his/her phone number (or other suitable contact information), an order button 412 to transmit an order request for a transportation vehicle, and a language button 414 (indicated as a flag) that allows the user to change the language presented to the user (as described with respect to FIG. 5). In some implementations, if the GUI window 400 is implemented on a client computing device, such as a mobile device, a device options menu 416 may be included. In other implementations, such as if the GUI window 400 is implemented on a kiosk, the device options menu 416 is omitted.

Figure 4B:
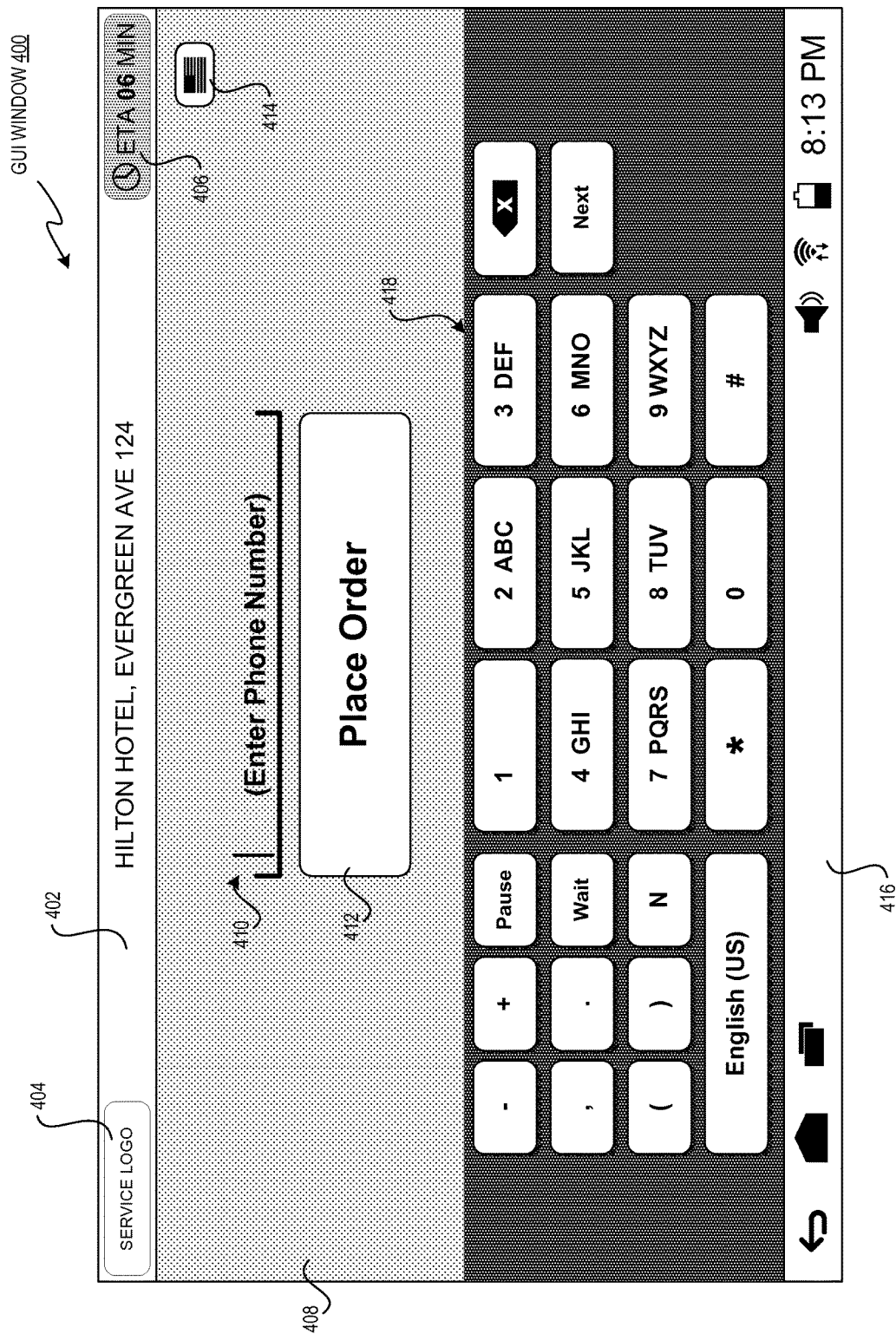
FIG. 4B illustrates another exemplary GUI window for ordering a transportation vehicle according to an implementation of the disclosure.
Figure 4C:
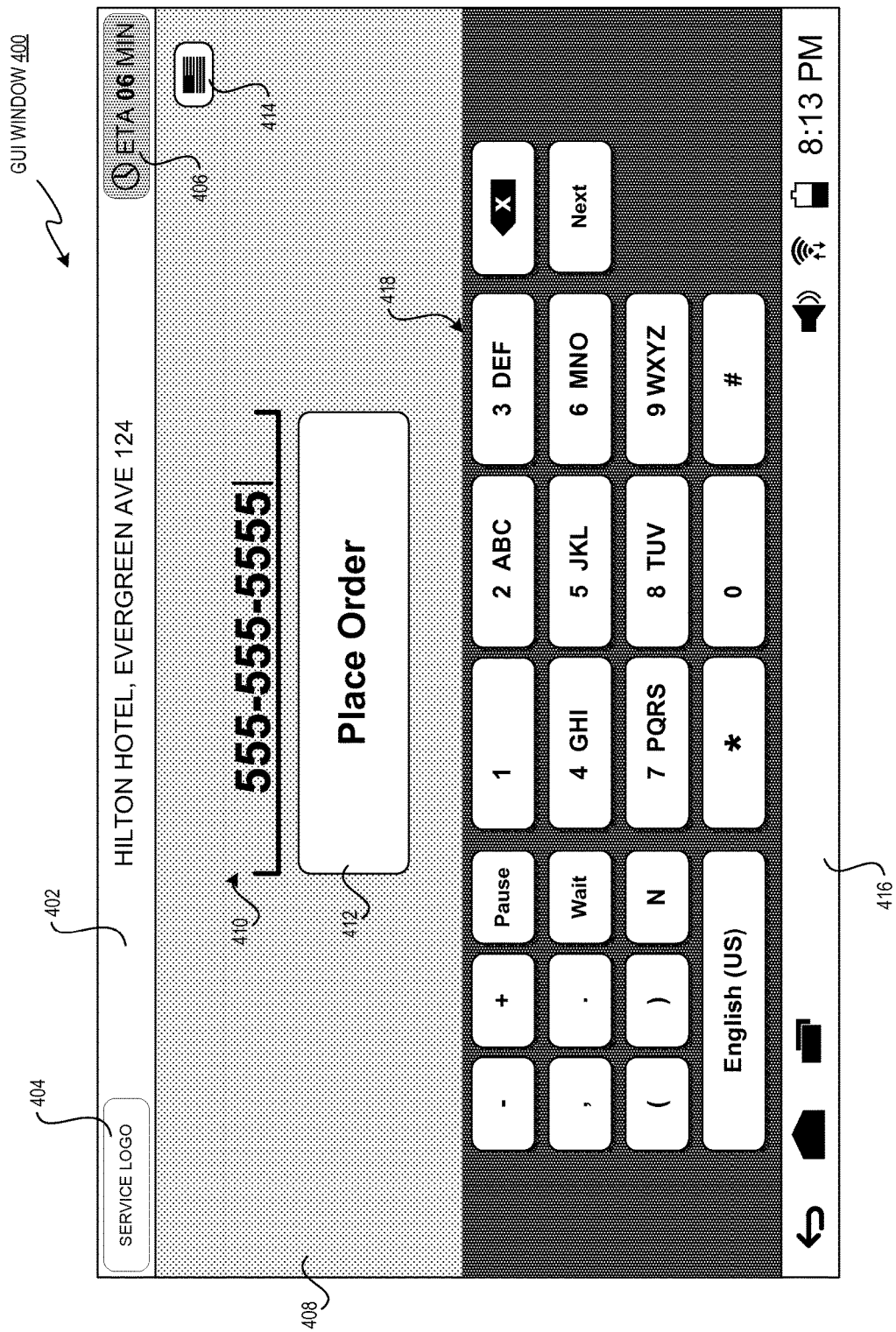
FIG. 4C illustrates another exemplary GUI window for ordering a transportation vehicle according to an implementation of the disclosure.
Figure 4D:
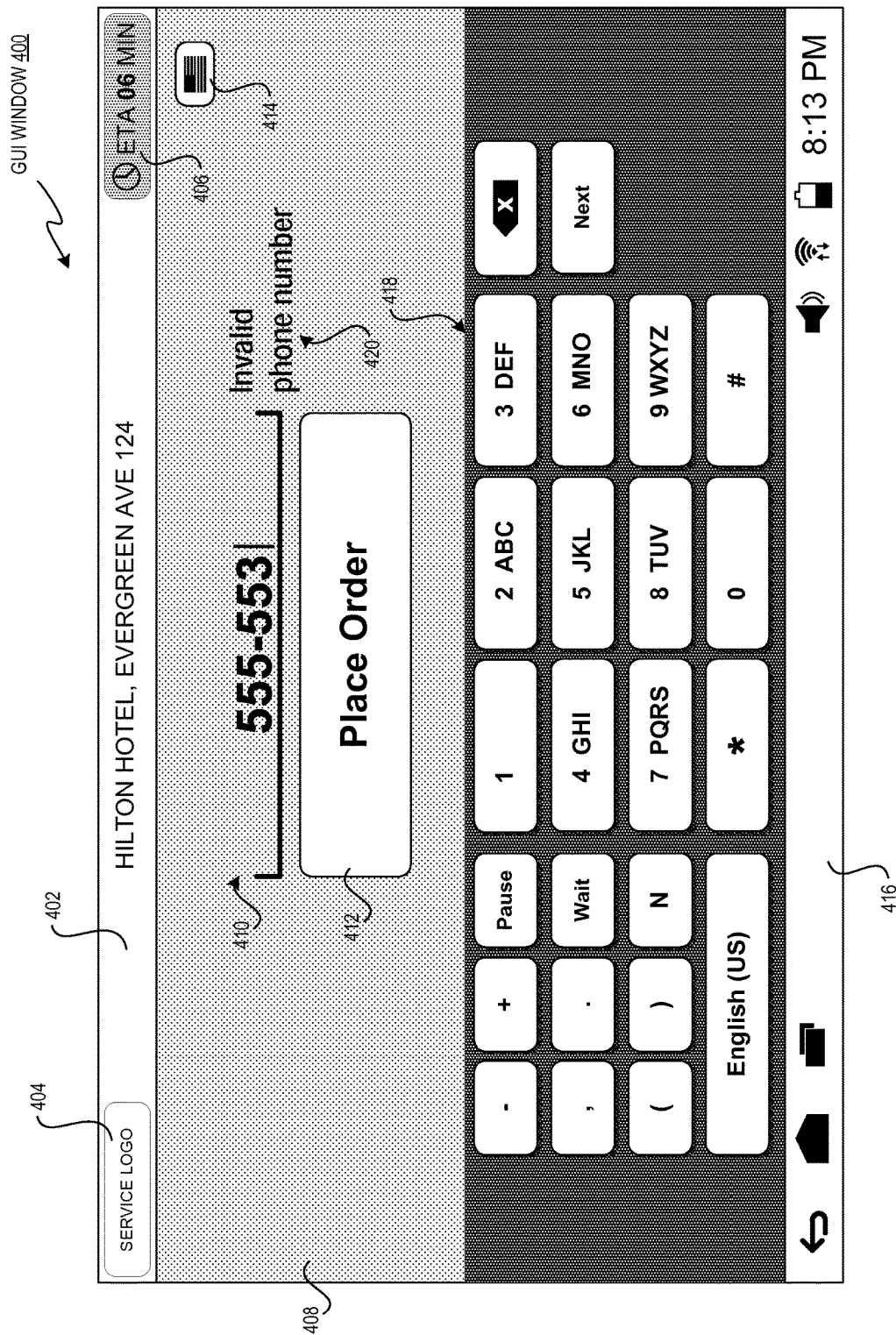
FIG. 4D illustrates another exemplary GUI window for ordering a transportation vehicle according to an implementation of the disclosure.

In one implementation, a keypad 418 for entering a phone number may be presented in the GUI window 400, as illustrated in FIG. 4B. FIG. 4C illustrates the GUI window 400 when the phone number has been entered by the user. In one implementation, if the GUI window 400 is implemented on a client computing device (e.g., a smart phone), a phone number associated with the client computing device may be entered automatically. In some implementations, if an invalid phone number is entered, the GUI window 400 (as illustrated in FIG. 4D) may display an error message 420. For example, the error message 420 may be displayed if the user selects the order button 412 when too few digits have been entered or no phone number (or contact information) has been entered.

Figure 4E:
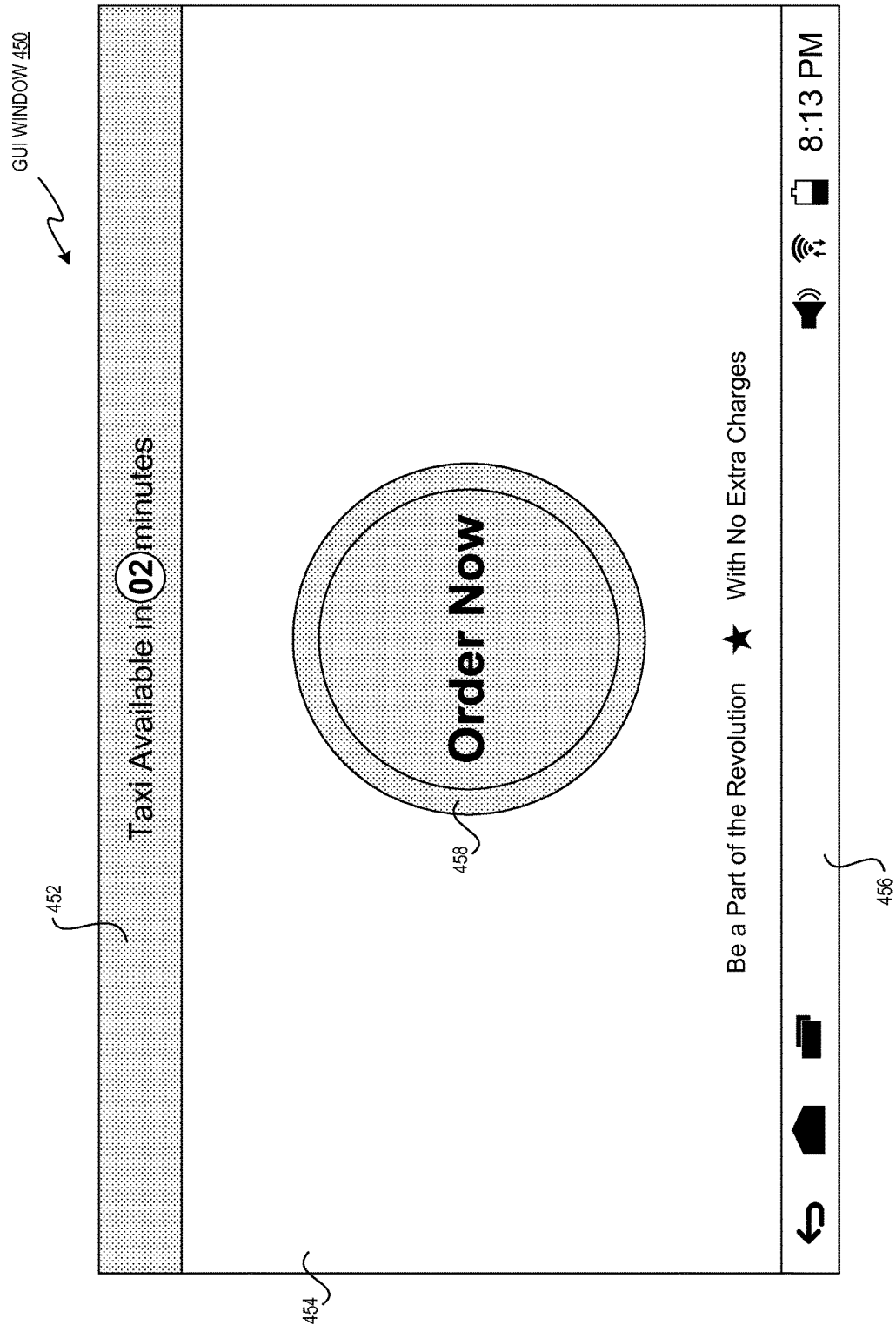
FIG. 4E illustrates another exemplary GUI window for ordering a transportation vehicle according to an implementation of the disclosure.
Figure 4F:
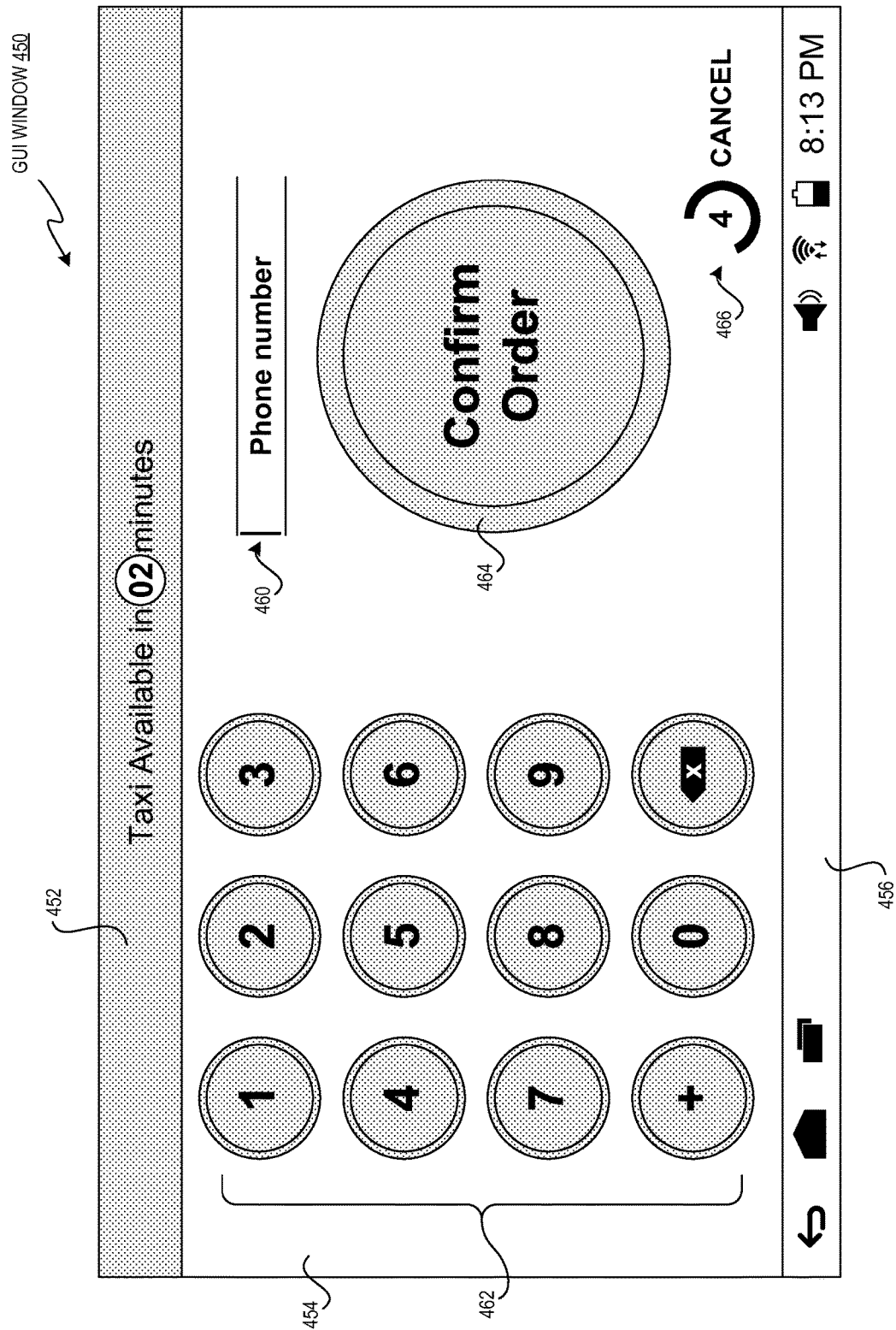
FIG. 4F illustrates another exemplary GUI window for ordering a transportation vehicle according to an implementation of the disclosure.

FIGS. 4E and 4F illustrate an alternative GUI window 450 according to an implementation of the disclosure. As illustrated in FIG. 4E, the GUI window 450 includes a header region 452 (which may indicate an estimated time of arrival of a transportation vehicle), a main window 454 that includes an order initiation button 458, and a device options menu 456. The device options menu 456 may be included in the GUI window 450 if the GUI window 450 is implemented on a client computing device, or may be omitted if the GUI window 450 is implemented on a kiosk. In response to receiving a user selection of the order initiation button 458, the GUI window 450 may present a text field 460 for entering a phone number, numerical keypad buttons 462 (or alphanumerical keypad buttons), an order confirmation button 464, and a cancel button 466, as illustrated in FIG. 4F. In some implementations, the user has a finite amount of time to place an order, as illustrated by a timer adjacent to the cancel button 466. If the order is cancelled, the GUI window 450 may revert back to the display illustrated in FIG. 4E.

Figure 5:
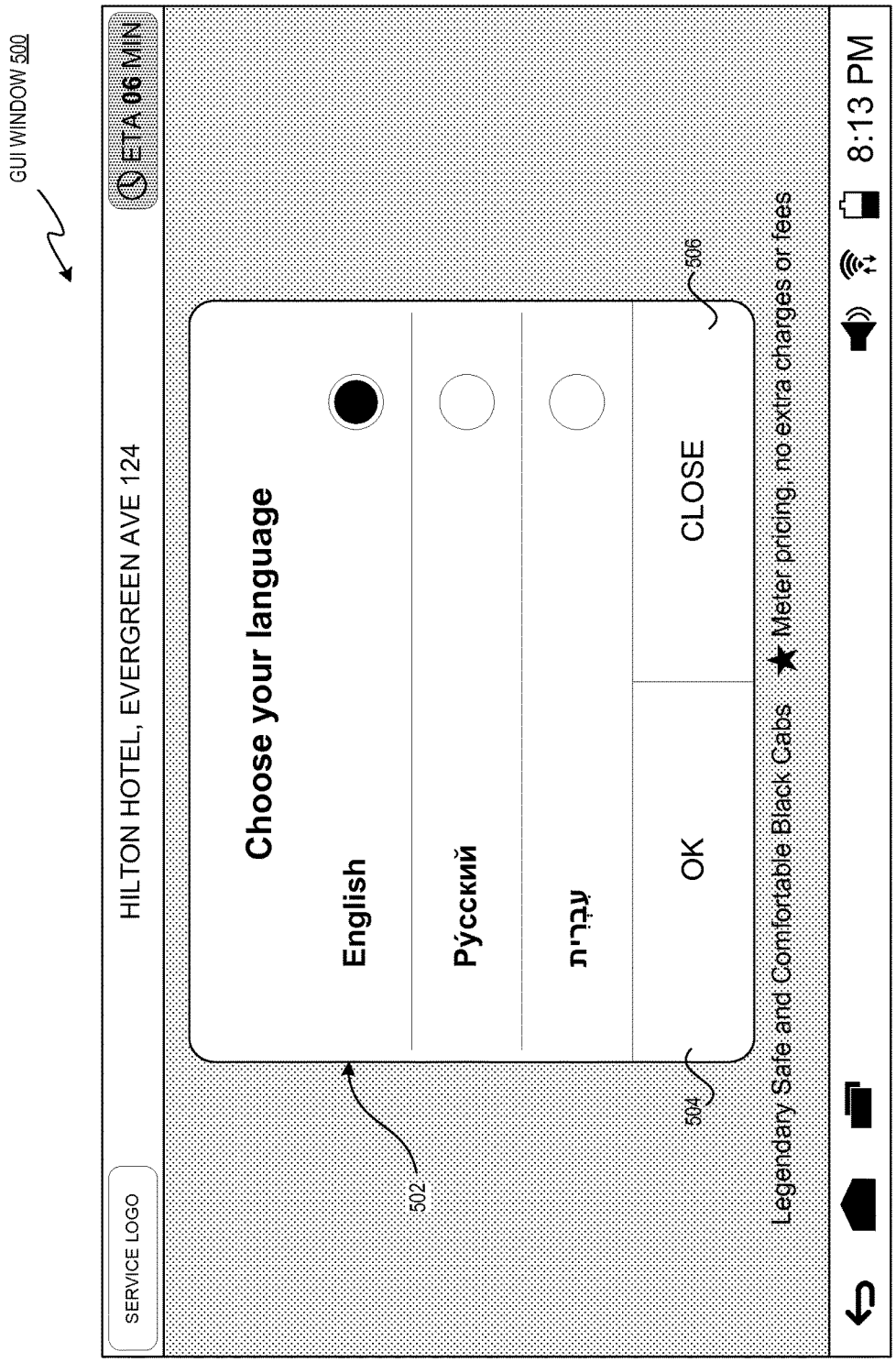
FIG. 5 illustrates an exemplary GUI window for selecting a language according to an implementation of the disclosure.

In one implementation, as illustrated in FIG. 5, a GUI window 500 may be displayed in response to a user selection of the language button 414 of FIGS. 4A-4D. The GUI window 500 may present a language menu 502 that allows a user to select one or more languages (e.g., English, Russian, Hebrew, etc.) to be displayed and/or used by the kiosk or client computing device. Once the user selects a language, the user may select a confirmation button 504 to cause the language of the kiosk or client computing device to change. The user may also select a close button 506 to return to a previous screen (e.g., the GUI window 400).

Figure 6A:
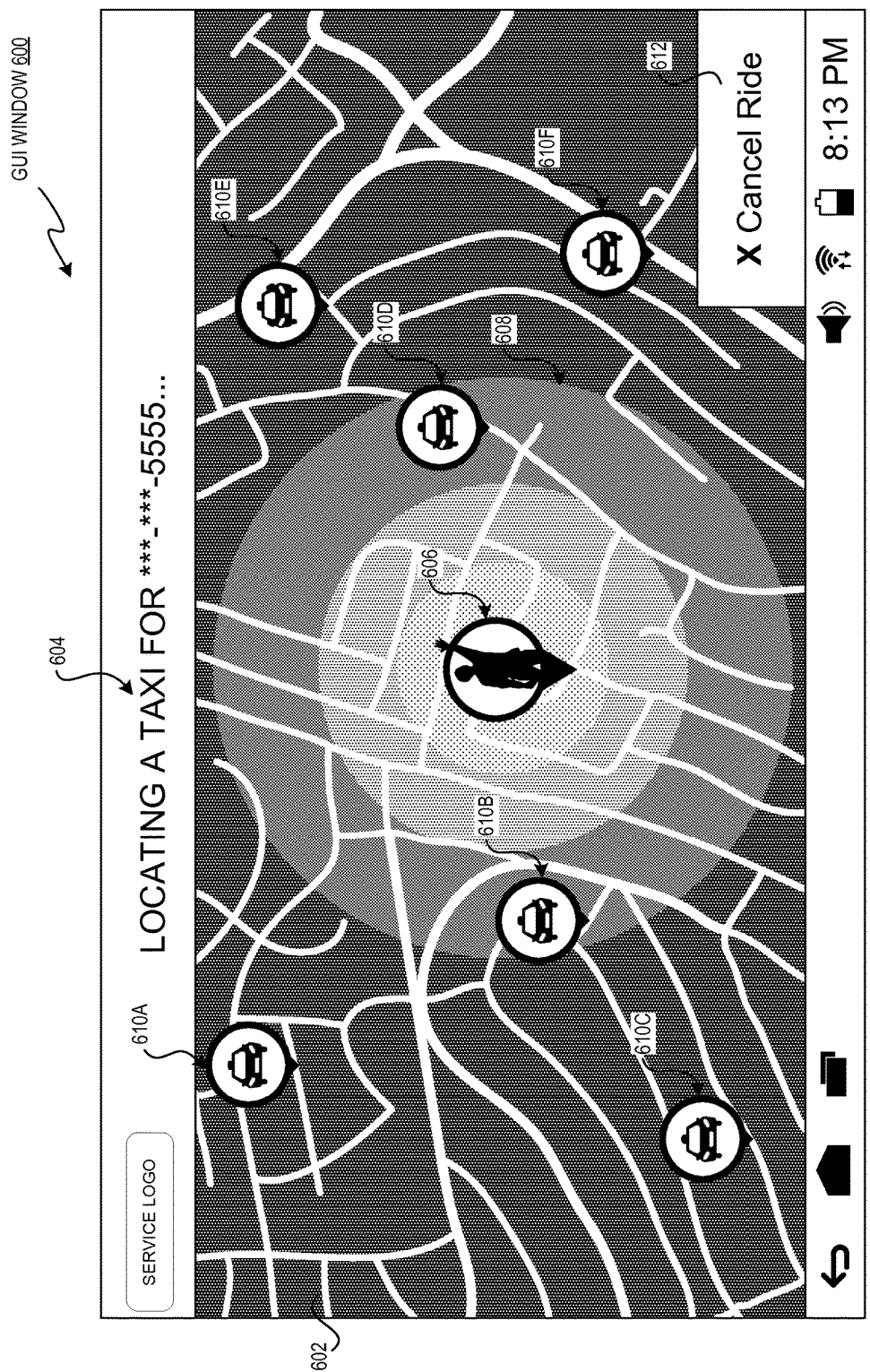
FIG. 6A illustrates an exemplary GUI window for providing vehicle location information to a user according to an implementation of the disclosure.

Referring once again to FIG. 3, at block 304, the order request is transmitted (e.g., using the order placement module 206) to a vehicle computing device of a transportation vehicle (e.g., one of vehicle computing devices 150A-150Z). In some implementations, the order request is transmitted to one or more additional vehicle computing devices of additional transportation vehicles. As illustrated in FIG. 6A, a GUI window 600 may be presented by the kiosk or client computing device, which includes a map region 602 to provides a map of the geographical area around the kiosk, and a header region 604 that may display order-related messages. The map region 602 depicts a user location indicator 606 corresponding to a location of the user (e.g., of the client computing device) or the kiosk. The map region 602 also depicts vehicle location indicators 610A-610F which corresponds to current locations of transportation vehicles in the same geographical area as the user/kiosk.

In some implementations, vehicle information (e.g., driver name, vehicle type, etc.) is displayed adjacent to or as part of vehicle location indicators 610A-610F. In some implementations, the GUI window 600 may display location related information that is received from the transportation server (e.g., the tracking module 204 of the ordering component 200). In some implementations, the GUI window 600 includes a cancel option 612 that allows the user to cancel the order request.

In some implementations, the map region 602 also includes a radar indicator 608 that corresponds to a pre-defined range of the search for transportation vehicles. In some implementations, the order placement module 206 transmits the order request to vehicle computing devices of transportation vehicles within the pre-defined range (e.g., vehicles depicted by vehicle location indicators 610B and 610D). In some implementations, the order placement module 206 transmits the order request to all transportation vehicles serviced by the kiosk in the geographical area (e.g., vehicles depicted by vehicle location indicators 610A-610F). In some implementations, the user may select one or more transportation vehicles manually (e.g., by touching, clicking, or otherwise indicating selection of) one or more of vehicle location indicators 610A-610F on the kiosk or client computing device), which may result in the order placement module 206 transmitting the order request to the one or more selected transportation vehicles. In another implementation, the user may select one or more transportation vehicles from a list of transportation vehicles that includes relevant information for each of the transportation vehicles. In some implementations, the GUI window 600 also includes a search progress indicator (e.g., a bar or pie graph in the GUI window 600) that provides information about the progress of the search for a transportation vehicle (e.g., the bar grows as more transportation vehicles are located).

Referring back to FIG. 3, at block 306, a response is received (e.g., at the transportation server 110) from the vehicle computing device indicating acceptance of the order request. In some implementations, the order placement module 206 receives one or more responses from the additional vehicle computing devices indicating acceptance of the order request. The order placement module 206 may determine that the response received from the vehicle computing device was received prior to receiving the one or more responses from any of the additional computing devices. Accordingly, the order placement module 206 may assign the transportation vehicle corresponding to the vehicle computing device as the transportation vehicle that is to pick up the user.

In one implementation, the tracking module 204 may determine estimated times of arrival for each of the transportation vehicles to which the order request was transmitted. The transportation vehicle with the fastest estimated time of arrival may be assigned as the transportation vehicle that is to pick up the user. In one implementation, the order component 200 (e.g., using the messaging module 208) transmits a message to the vehicle computing device of the assigned transportation vehicle indicating to the driver that he/she is to pick up the user at the kiosk/user location. In some implementations, the kiosk/user location data is automatically imported into a GPS device located on-board the transportation vehicle.

In some implementations, one or more responses received from vehicle computing devices may indicate that one or more drivers have declined the order request. In some implementations, if the order request is not accepted within a pre-determined time duration (e.g., 30 seconds, 1 minute, 5 minutes, etc.), a message may be transmitted (e.g., by the messaging module 208) to the kiosk and/or client computing device of the user indicating that the search for a transportation vehicle has failed.

At block 308, a vehicle location of the transportation vehicle is identified (e.g., the transportation vehicle assigned to pick up the user). For example, the vehicle location may be determined from GPS data transmitted from the vehicle computing device to the tracking module 204. At block 310, the vehicle location is transmitted to the kiosk and/or client computing device of the user. In some implementations, the location data is transmitted from the transportation server to the kiosk and/or client computing device in real-time such that the kiosk and/or client computing device may display a graphical indication of the transportation vehicle location relative to the kiosk and/or client computing device location.

Figure 6B:
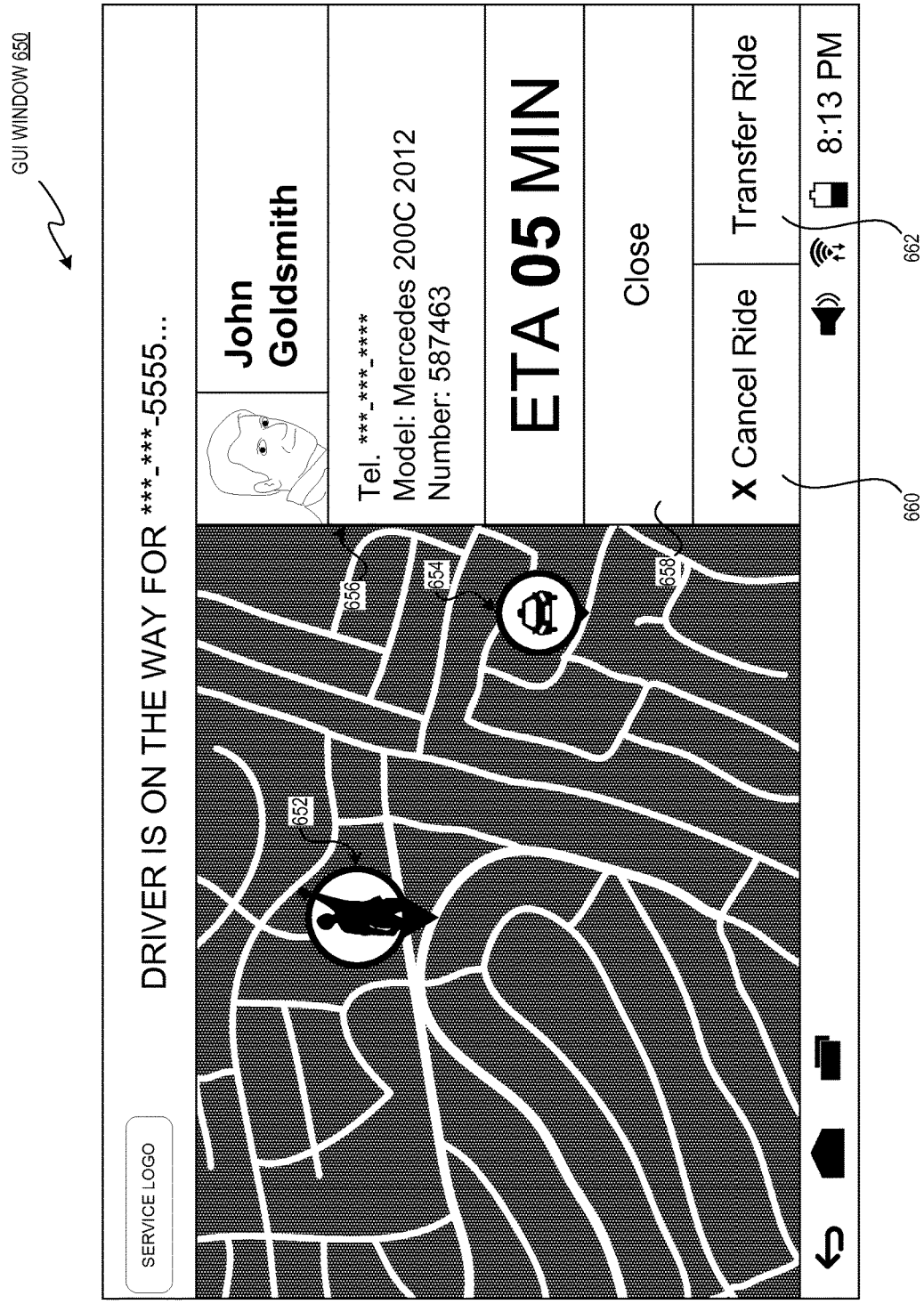
FIG. 6B illustrates another exemplary GUI window for providing vehicle location information to a user according to an implementation of the disclosure.

As illustrated in FIG. 6B, a GUI window 650 indicates that a transportation vehicle has been assigned to pick up the user. The GUI window 650 displays a user location indicator 652 and a vehicle location indicator 654 corresponding to the assigned transportation vehicle. The GUI window 650 also displays driver information 656, which may include the driver's name, telephone number, vehicle model, driver/vehicle number, etc., as well as an estimated time of arrival. The GUI also allows the user to cancel his/her request for a vehicle.

Figure 7A:
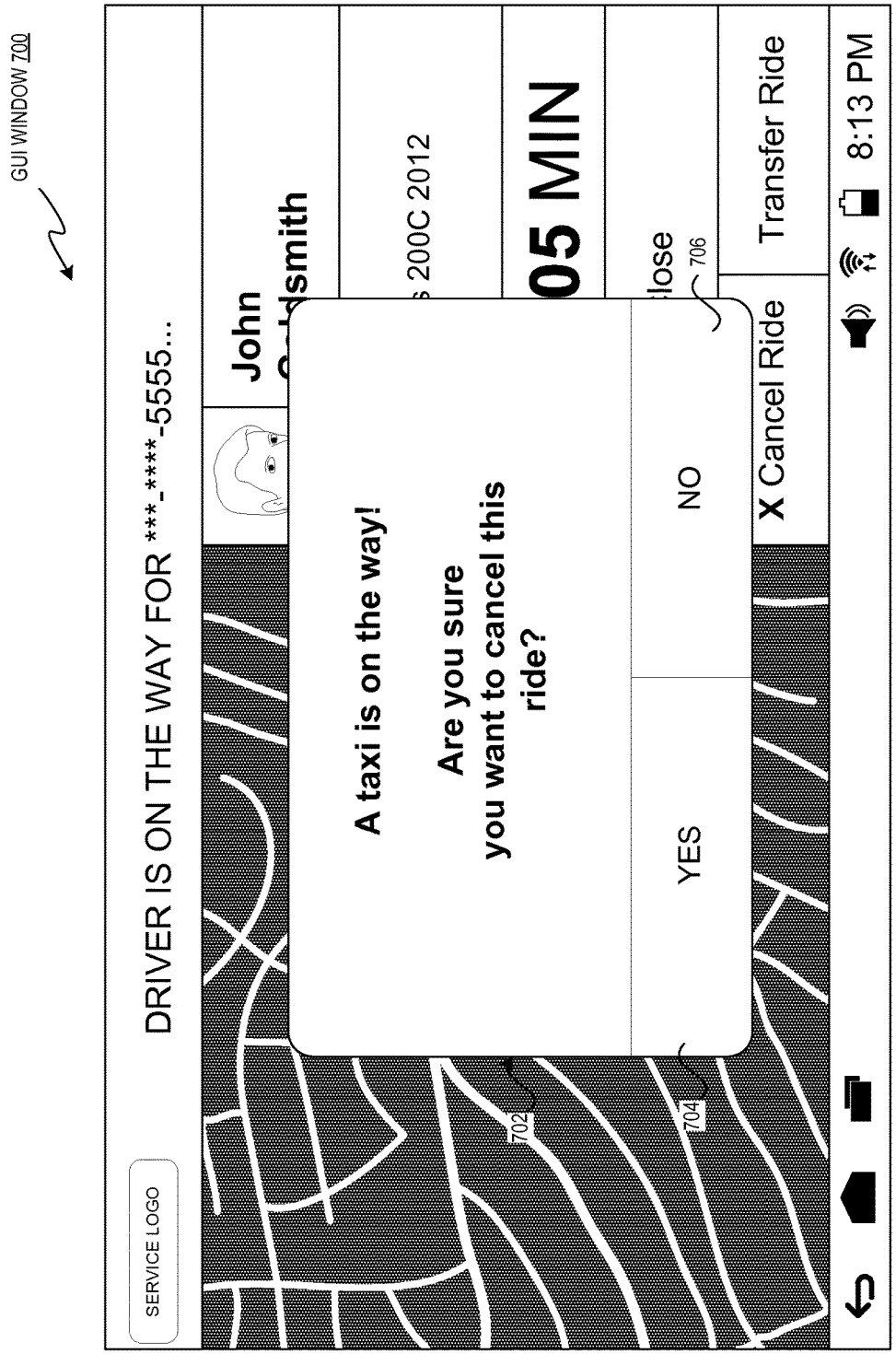
FIG. 7A illustrates an exemplary GUI window for cancelling an order request according to an implementation of the disclosure.

In one implementation, the GUI window 650 includes a close button 658 that may cause the GUI window 650 to return to a default screen (e.g., the GUI window 400). In one implementation, the GUI window 650 includes a cancel button 660, which may allow the user to cancel the order request. For example, in response to a user selection of the cancel button 660, a GUI window 700 (as illustrated in FIG. 7A) may be presented which includes a cancellation menu 702. The user may cancel the order by selecting a button 704, or may maintain the order request by selecting a button 706.

Figure 7B:
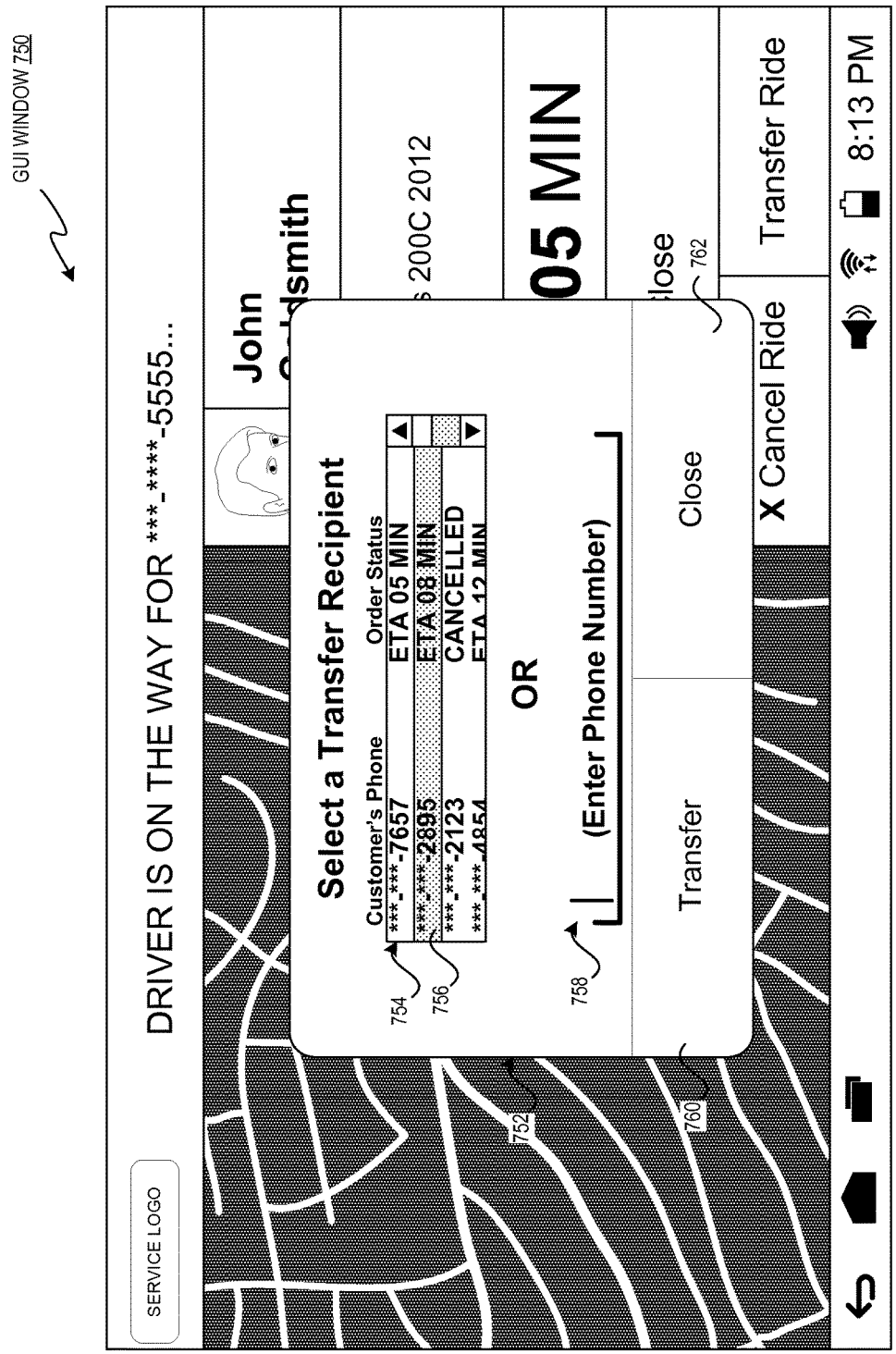
FIG. 7B illustrates an exemplary GUI window for transferring an order request according to an implementation of the disclosure.

In one implementation, the GUI window 650 includes a transfer button 662, which may allow the user to transfer his/her current order request to another user. For example, if the user decides that he/she does not need a taxi, he/she may transfer the taxi to another person, such as the next person in line, a friend, or a person having a pre-existing order. In response to a selection of the transfer button 662, a GUI window 750 (as illustrated in FIG. 7B) may be presented which includes a transfer menu 752. The transfer menu 752 may include a list 754 of previously placed orders. For example, the user may select an order listing 756 and transfer his/her current order to a user that placed the order indicated by the order listing 756 (e.g., in response to selecting a transfer button 760), and the order indicated by the order listing 756 may be cancelled. In one implementation, the user may enter a phone number of a transfer recipient in a text field 758, and transfer the current order to the transfer recipient by selecting the transfer button 760. In response to a selection of a close button 762, the GUI window 750 may revert back to the GUI window 700.

Figure 8A:
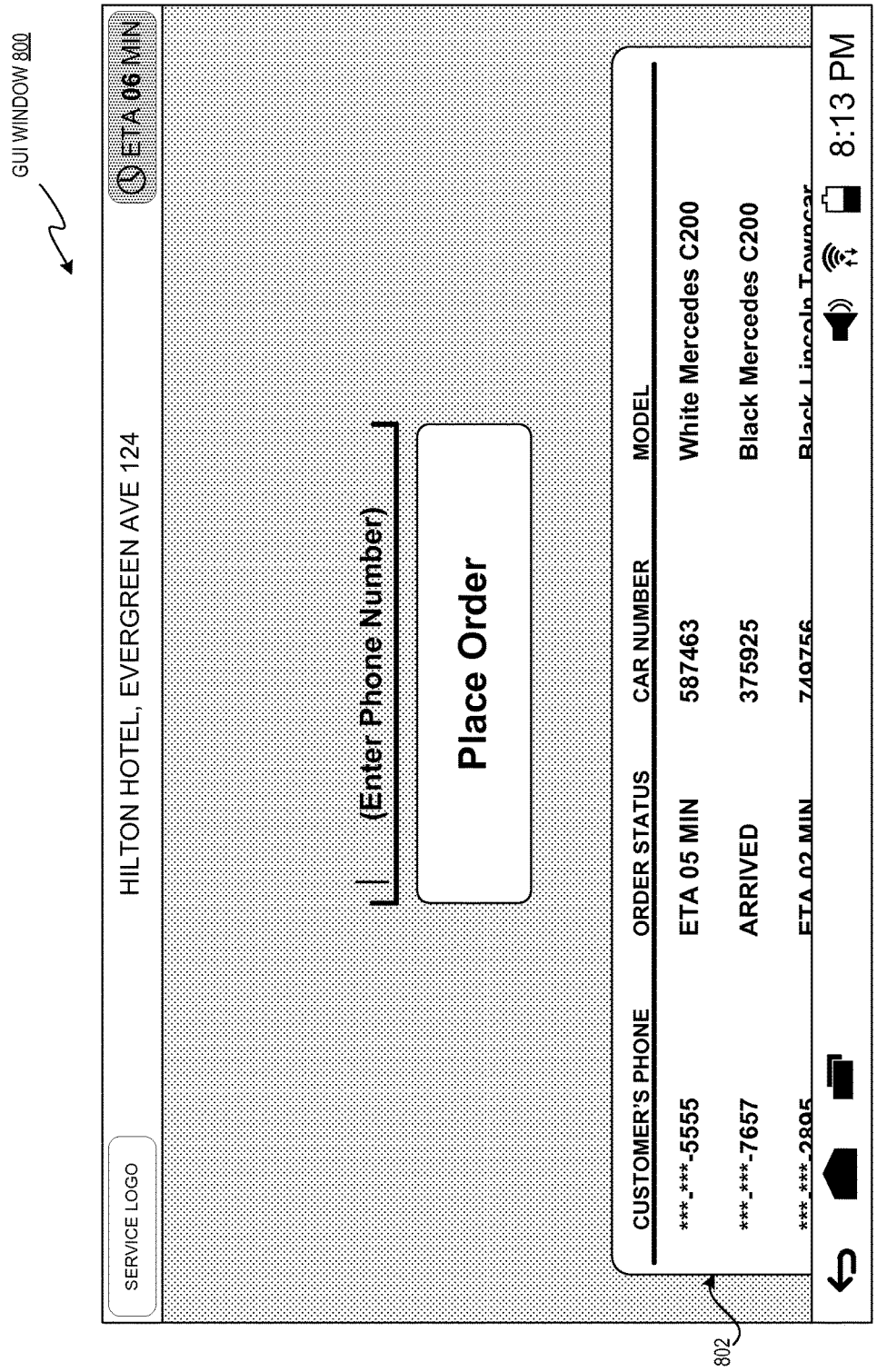
FIG. 8A illustrates an exemplary GUI window for providing a list of order requests according to an implementation of the disclosure.

FIG. 8A illustrates a GUI window 800 that may be displayed as an alternative to GUI window 400. For example, the GUI window 800 includes an order list 802 that displays previously placed orders at a kiosk. Each order request appears with relevant information including estimated times of arrival, vehicle information, etc. In one implementation, a subset of the digits of the user's phone numbers are also displayed to preserve the privacy of the users. Each order may be selectable, and selecting an order may open the order information screen with a live map (e.g., as illustrated in FIG. 6B). An order request from the order list 802 may automatically be removed once the user that placed the order request is on board the vehicle. In one implementation, if a user wishes to edit his/her order request, the user may be prompted to enter his/her full phone number to prevent the user from editing an order request that he/she did not place.

Figure 8B:
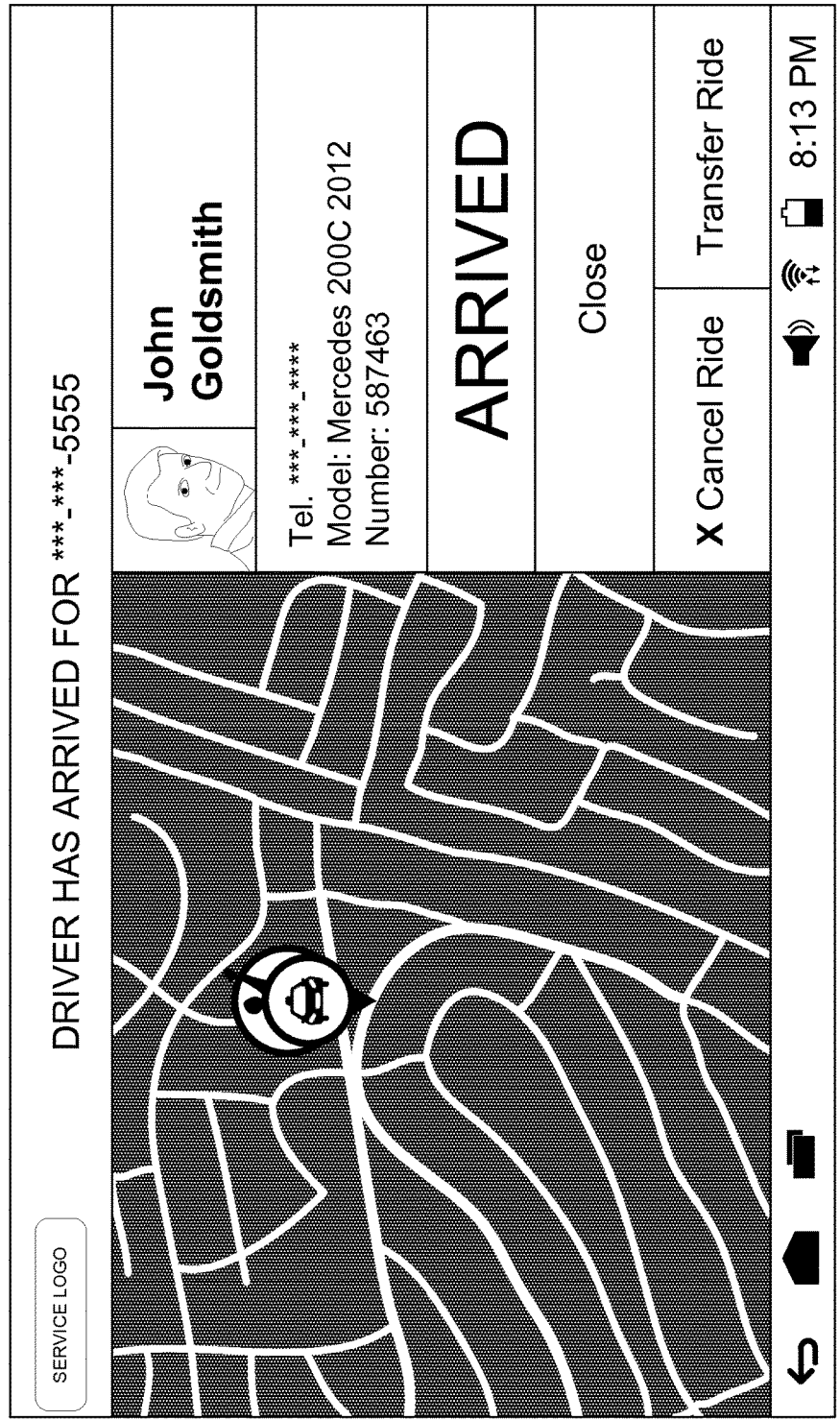
FIG. 8B illustrates an exemplary GUI window for providing an order request update according to an implementation of the disclosure.
Figure 8C:
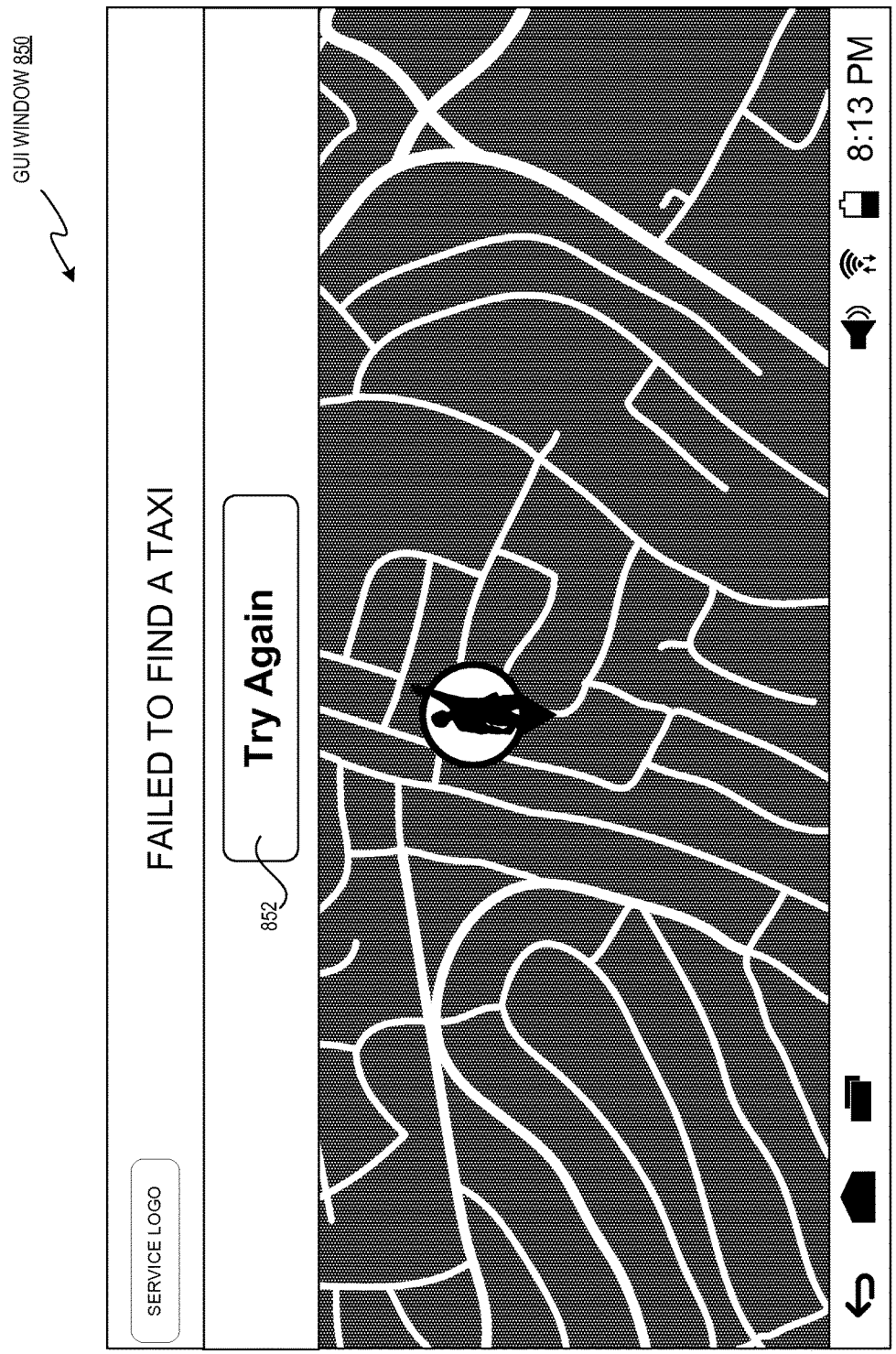
FIG. 8C illustrates an exemplary GUI window for indicating a failed order request according to an implementation of the disclosure.

In one implementation, the tracking module 204 may determine that a transportation vehicle has arrived at a kiosk or client computing device location. For example, based on received kiosk/user location data and vehicle location data, the tracking module 204 may determine that the transportation vehicle is within a pre-defined range of the kiosk/user location (e.g., within 10 feet, within 20 feet, etc.). As illustrated in FIG. 8B, a GUI window 825 may indicate to the user when the driver assigned to pick up the user has arrived. In one implementation, as illustrated in FIG. 8C, a GUI window 850 may be presented in the event that no transportation vehicle was located for the user and/or the driver en route to the kiosk/user location is unable to pick up the user, which provides the user with an option 852 to repeat the process.

In some implementations, a kiosk may automatically present a default GUI window (e.g., the GUI window 400 or the GUI window 800) when there is no user interaction for a particular duration of time (e.g., 10 seconds, 30 seconds, one minute, etc.). For example, after 5 seconds of inactivity, a timer appears with a countdown for 5 seconds before returning to the default GUI window. This timer feature may also be implemented by any of the GUI windows disclose herein.

Figure 9:
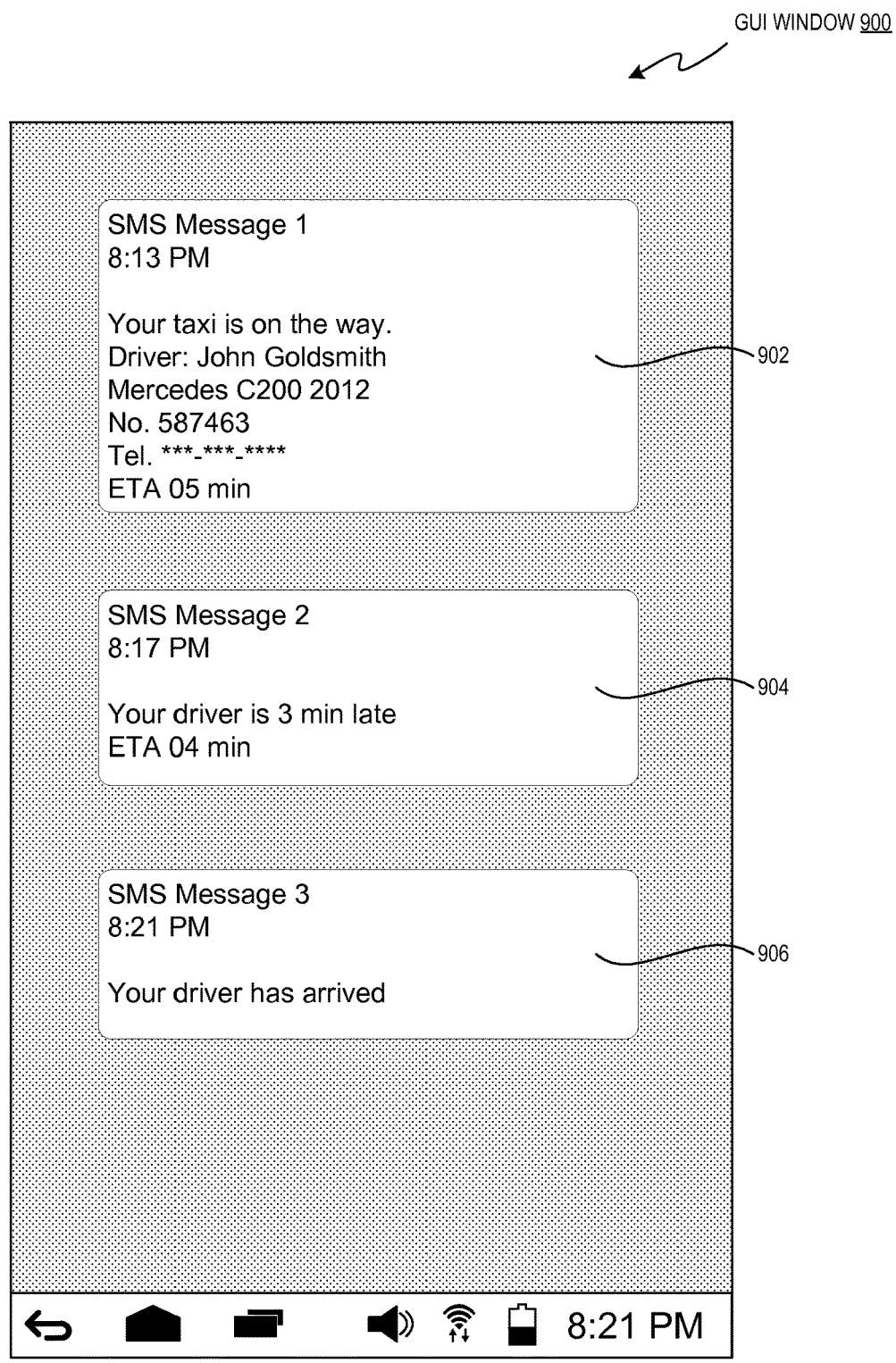
FIG. 9 illustrates an exemplary GUI window showing order status messages received by a client computing device according to an implementation of the disclosure.

FIG. 9 illustrates example messages that may be transmitted by a server transportation server (e.g., the messaging module 208 of the transportation server 110) to a client computing device of a user during the ordering process. A GUI window 900 of the client computing device may display status messages 902, 904, and 906 at different times after an order has been placed and up to arrival of the transportation vehicle. For example, the user may provide a mobile or cellular telephone number to a kiosk when ordering a transportation vehicle. In response, the transportation server may transmit one or more of an SMS message, an e-mail, a text messages, etc., to the client computing device to provide information about the transportation vehicle (e.g., estimated time of arrival for the transportation vehicle, driver name, vehicle make/model, etc.). The kiosk may also receive this information from the servers and may display information about the transportation vehicle on a screen (e.g., in the form of pop-up messages, which may be displayed while other users are placing order requests).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture, such as a computer-readable device or storage medium, to facilitate transporting and transferring such methods to computing devices. Accordingly, the term "article of manufacture", as used herein, is intended to include a computer program accessible from any computer-readable device or storage medium.

In one aspect of the present disclosure, a method includes receiving, by a processing device, an order request from a kiosk at a kiosk location. The order request is transmitted by the processing device to a computing device of a transportation vehicle. A response from the computing device is received from the transportation vehicle indicating acceptance of the order request. A vehicle location of the transportation vehicle is identified by the processing device, and the vehicle location is transmitted by the processing device to the kiosk.

In one implementation, the method further includes determining that the transportation vehicle has arrived at the kiosk location, and transmitting a message to at least one of a client computing device or the kiosk. The message may indicate that the transportation vehicle has arrived at the kiosk location.

In one implementation, determining that the transportation vehicle has arrived at the kiosk location includes determining that the vehicle location is within a pre-defined range of the kiosk location.

In one implementation, the method further includes transmitting the order request to one or more additional computing devices of additional transportation vehicles.

In one implementation, the method further includes determining that the response received from the computing device was received prior to receiving one or more responses from any of the one or more additional computing devices. The method further includes transmitting a message to at least one of a client computing device or the kiosk indicating that the transportation vehicle is traveling to the kiosk location.

In one implementation, the method further includes determining an estimated time of arrival of the transportation vehicle based on the vehicle location, and identifying locations of one or more additional transportation vehicles. The method further includes determining estimated times of arrival for each of the one or more additional transportation vehicles based the locations of the one or more additional transportation vehicles. The order request may be transmitted to the computing device of the transportation vehicle in response to determining that the estimated time of arrival of the transportation vehicle is less than each of the estimated times of arrival of the one or more additional transportation vehicles.

In one implementation, identifying the vehicle location further includes receiving location data from the computing device of the transportation vehicle and identifying the vehicle location based on the location data. In one implementation, the kiosk is to present for display a graphical indication of the vehicle location relative to the kiosk location.

In one or more of the disclosed implementations, systems (e.g., systems including memories, processing devices, etc.) for performing operations of the aforementioned methods are also disclosed. Additionally, in implementations of the disclosure, a computer-readable storage medium (e.g., a non-transitory computer-readable storage medium) may encode operations for performing the aforementioned methods.

Figure 10:
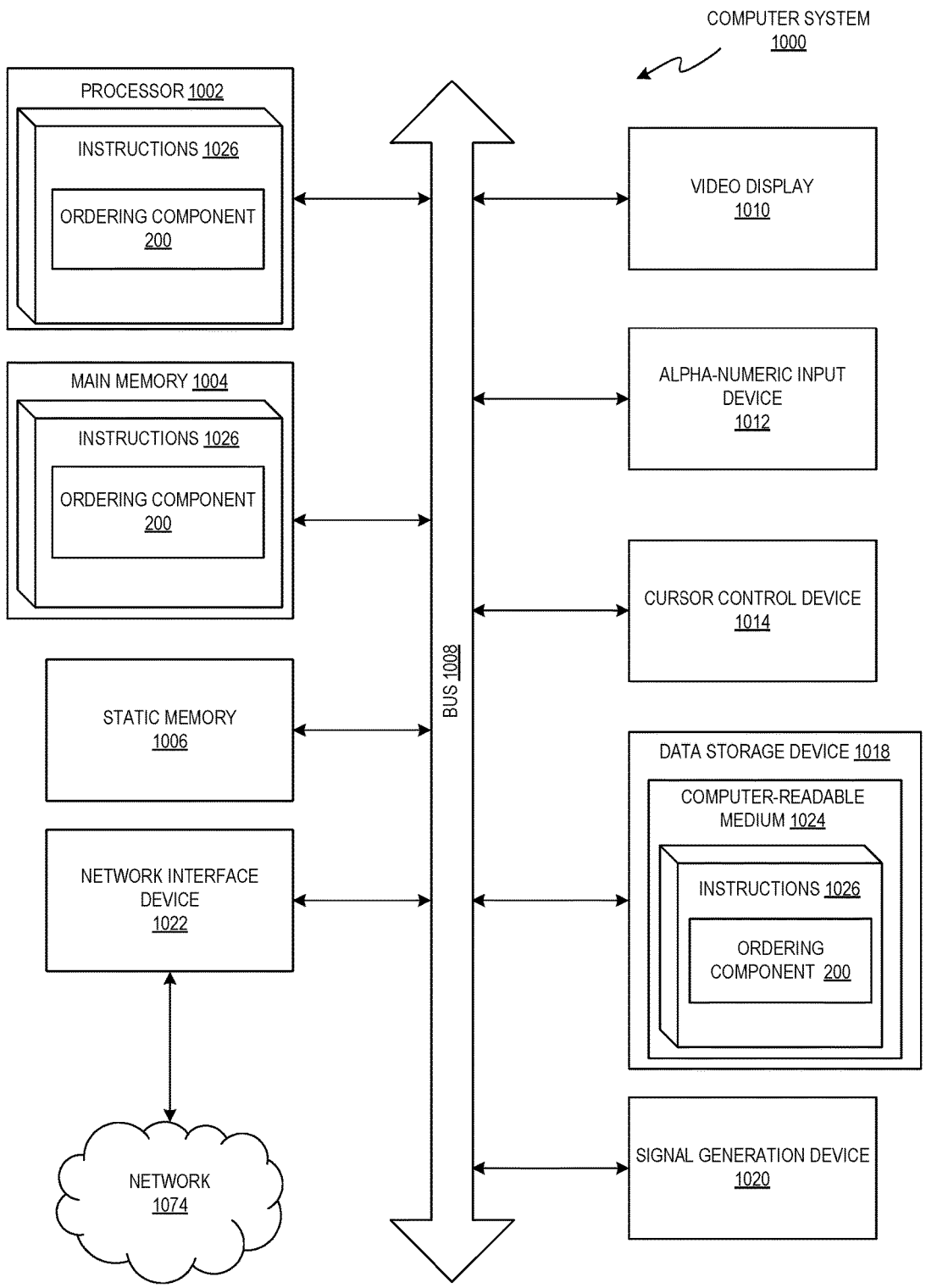
FIG. 10 is a block diagram illustrating an exemplary computer system for use in accordance an implementation of the disclosure.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 1000 may be utilized by or illustrative of any of the transportation server 110, the kiosks 120A-120Z, the data store 130, the client computing devices 140A-140Z, the vehicle computing devices 150A-150Z, and the map data server 160.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a CISC microprocessor, a RISC microprocessor, a VLIW microprocessor, or a processor implementing other instruction sets or processors implementing a combination of instruction sets. The processor 1002 may also be one or more special-purpose processing devices such as an ASIC, an FPGA, a DSP, a network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD), a cathode ray tube (CRT), or a touch screen), an alphanumeric input device 1012 (e.g., a keyboard), a cursor control device 1014 (e.g., a mouse), and a signal generation device 1020 (e.g., a speaker). In some implementations, the signal generation device 1020 may include a vibrational actuator (e.g., for providing haptic feedback).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 (e.g., the network 105) via the network interface device 1022.

In one implementation, the instructions 1026 include instructions for one or more ordering components 200, which may correspond to the identically-named counterpart described with respect to FIGS. 1 and 2. While the computer-readable storage medium 1024 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The terms "computer-readable storage medium" or "machine-readable storage medium" shall accordingly be taken to include, but not be limited to, solid-state memories, optical media, and magnetic media.

The above description sets forth numerous specific details such as examples of specific systems, components, methods and so forth, in order to provide a thorough understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "sending", "receiving", "transmitting", "forwarding", "caching", "causing", "providing", "generating", "adding", "subtracting", "removing", "estimating", "analyzing", "determining", "enabling", "identifying", "modifying" or the like, refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation. It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of a kiosk associated with a transportation system via a graphical user interface (GUI) of the kiosk, first user input comprising a first transportation request to transport a first user to a first destination location, wherein the first transportation request is placed by the first user of the kiosk;
   receiving, by the processing device of the kiosk via the GUI, second user input comprising a second transportation request to transport a second user to a second destination location, wherein the second transportation request is placed by the second user of the kiosk, wherein the kiosk is a public terminal located at a fixed geographic location;
   transmitting, by the processing device of the kiosk, the first transportation request, the second transportation request, and an identifier of the kiosk to a transportation server of the transportation system, wherein the transportation server is to determine the fixed geographic location based on the identifier of the kiosk and is to transmit the first transportation request, the second transportation request, and the fixed geographic location to a plurality of vehicle computing devices within a first pre-defined range of the fixed geographic location;
   receiving, by the processing device of the kiosk from the transportation server, location data descriptive of a corresponding location of each of the plurality of vehicle computing devices;

generating for display, by the processing device of the kiosk, a visual representation of one or more of the plurality of vehicle computing devices relative to the fixed geographic location based on the location data;

receiving, by the processing device of the kiosk, a response from the transportation server indicating a first acceptance of the first transportation request by a first vehicle computing device of the plurality of vehicle computing devices and a second acceptance of the second transportation request by a second vehicle computing device of the plurality of vehicle computing devices;

receiving, by the processing device of the kiosk, updated location data describing updated corresponding locations of the first vehicle computing device and the second vehicle computing device; and generating for display, by the processing device of the kiosk:
  a list of transportation requests comprising the first transportation request placed by the first user and the second transportation request placed by the second user;
  first information that is associated with the first transportation request, is displayed adjacent to the first transportation request, and comprises first details of the first transportation request and a portion of first contact information of the first user; and
  second information that is associated with the second transportation request, is displayed adjacent to the second transportation request, and comprises second details of the second transportation request and a portion of second contact information of the second user.

2. The method of claim 1, further comprising:
determining that a first transportation vehicle associated with the first vehicle computing device has arrived at the fixed geographic location; and
transmitting a message to a first client computing device of the first user, wherein the message indicates that the first transportation vehicle has arrived at the fixed geographic location.

3. The method of claim 2, wherein determining that the first transportation vehicle has arrived at the fixed geographic location comprises determining that a current location of the first transportation vehicle is within a second pre-defined range of the fixed geographic location.

4. The method of claim 1, further comprising:
receiving, by the processing device, a message indicating that a first transportation vehicle associated with the first vehicle computing device is traveling to the fixed geographic location.

5. A kiosk comprising:
a memory; and
a processing device communicatively coupled to the memory, wherein the processing device is to:
  receive, via a graphical user interface (GUI) of the kiosk, first user input comprising a first transportation request to transport a first user to a first destination location, wherein the first transportation request is placed by the first user of the kiosk;
  receiving, by the processing device of the kiosk via the GUI, second user input comprising a second transportation request to transport a second user to a second destination location, wherein the second transportation request is placed by the second user of the kiosk, wherein the kiosk is a public terminal located at a fixed geographic location;
  transmit the first transportation request, the second transportation request, and an identifier of the kiosk to a transportation server, wherein the transportation server is to determine the fixed geographic location based on the identifier of the kiosk and is to transmit the first transportation request, the second transportation request, and the fixed geographic location to a plurality of vehicle computing devices within a first pre-defined range of the fixed geographic location;
  receive, from the transportation server, location data descriptive of a corresponding location of each of the plurality of vehicle computing devices;
  generate for display a visual representation of one or more of the plurality of vehicle computing devices relative to the fixed geographic location based on the location data;
  receive a response from the transportation server indicating a first acceptance of the first transportation request by a first vehicle computing device of the plurality of vehicle computing devices and a second acceptance of the second transportation request by a second vehicle computing device of the plurality of vehicle computing devices;
  receive updated location data describing updated corresponding locations of the first vehicle computing device and the second vehicle computing device; and
  generate for display:
    a list of transportation requests comprising the first transportation request placed by the first user and the second transportation request placed by the second user;
    first information that is associated with the first transportation request, is displayed adjacent to the first transportation request, and comprises first details of the first transportation request and a portion of first contact information of associated with the first user; and
    second information that is associated with the second transportation request, is displayed adjacent to the second transportation request, and comprises second details of the second transportation request and a portion of second contact information of the second user.

6. The kiosk of claim 5, wherein the processing device is further to:
determine that a first transportation vehicle associated with the first vehicle computing device has arrived at the fixed geographic location; and
transmit a message to a first client computing device of the first user, wherein the message indicates that the first transportation vehicle has arrived at the fixed geographic location.

7. The kiosk of claim 6, wherein to determine that the first transportation vehicle has arrived at the fixed geographic location, the processing device is further to determine that a current location of the first transportation vehicle is within a second pre-defined range of the fixed geographic location.

8. The kiosk of claim 5, wherein the processing device is further to:
receive a message indicating that a first transportation vehicle associated with the first vehicle computing device is traveling to the fixed geographic location.

9. A non-transitory computer-readable storage medium having instructions encoded thereon which, when executed by a processing device of a kiosk, cause the processing device to perform operations comprising:
- receiving, via a graphical user interface (GUI) of the kiosk, first user input comprising a first transportation request to transport a first user to a first destination location, wherein the first transportation request is placed by the first user of the kiosk;
- receiving, by the processing device of the kiosk via the GUI, second user input comprising a second transportation request to transport a second user to a second destination location, wherein the second transportation request is placed by the second user of the kiosk, wherein the kiosk is a public terminal located at a fixed geographic location;
- transmitting the first transportation request, the second transportation request, and an identifier of the kiosk to a transportation server, wherein the transportation server is to determine the fixed geographic location based on the identifier of the kiosk and is to transmit the first transportation request, the second transportation request, and the fixed geographic location to a plurality of vehicle computing devices within a first pre-defined range of the fixed geographic location;
- receiving, from the transportation server, location data is descriptive of a corresponding location of each of the plurality of vehicle computing devices;
- generating for display a visual representation one or more of the plurality of vehicle computing devices relative to the fixed geographic location based on the location data;
- receiving a response from the transportation server indicating a first acceptance of the first transportation request by a first vehicle computing device of the plurality of vehicle computing devices and a second acceptance of the second transportation request by a second vehicle computing device of the plurality of vehicle computing devices;
- receiving updated location data describing updated corresponding locations of the first vehicle computing device and the second vehicle computing device; and
- generating for display:
  - a list of transportation requests comprising the first transportation request placed by the first user and the second transportation request placed by the second user;
  - first information that is associated with the first transportation request, is displayed adjacent to the first transportation request, and comprises first details of the first transportation request and a portion of first contact information of the first user; and
  - second information that is associated with the second transportation request, is displayed adjacent to the second transportation request, and comprises second details of the second transportation request and a portion of second contact information of the second user.

10. The non-transitory computer-readable storage medium of claim 9, wherein the operations further comprise:
receiving a message indicating that a first transportation vehicle associated with the first vehicle computing device has arrived at the fixed geographic location.

11. The method of claim 1, further comprising:
receiving, by the processing device, a request to transfer the first transportation request associated with the first user to a third user; and
updating, by the processing device, the first transportation request to associate the first transportation request with the third user.

12. The kiosk of claim 5, wherein the processing device is to:
receive a request to transfer the first transportation request associated with the first user to a third user; and
update the first transportation request to associate the first transportation request with the third user.

13. The non-transitory computer-readable storage medium of claim 9, wherein the operations further comprise:
receiving a request to transfer the first transportation request associated with the first user to a third user; and
updating the first transportation request to associate the first transportation request with the third user.

14. The method of claim 11, wherein the receiving of the request to transfer the first transportation request to the third user comprises receiving user input comprising third contact information of the third user.

15. The method of claim 11, wherein subsequent to the receiving of the request to transfer the first transportation request to the third user, the method further comprises generating for display third information that is associated with the first transportation request, is displayed adjacent to the first transportation request, and comprises the first details of the first transportation request and a portion of third contact information of the third user.

16. The method of claim 1 further comprising determining, based on the updated location data, a first estimated arrival time of a first transportation vehicle associated with the first vehicle computing device and a second estimated arrival time of a second transportation vehicle associated with the second vehicle computing device, wherein the first information further comprises the first estimated arrival time and the second information further comprises the second estimated arrival time.

17. The method of claim 1, wherein:
the first information further comprises a first vehicle identifier associated with the first vehicle computing device; and
the second information further comprises a second vehicle identifier associated with the second vehicle computing device.

18. The method of claim 1, wherein:
the receiving of the first transportation request is without receiving a first pickup location, wherein the transmitting of the first transportation request is without transmitting the first pickup location.

19. The method of claim 1, wherein the transportation server is to determine the fixed geographic location by accessing a database of identifiers and corresponding fixed locations.

20. The method of claim 1, wherein the generating for display the list of transportation requests is:
subsequent to a first transportation vehicle associated with the first vehicle computing device being dispatched to fulfill the first transportation request and a second transportation vehicle associated with the second vehicle computing device being dispatched to fulfill the second transportation request; and
prior to arrival of the first transportation vehicle and the second transportation vehicle at the fixed geographic location.

* * * * *